US008010399B1

(12) United States Patent
Bruce et al.

(10) Patent No.: US 8,010,399 B1
(45) Date of Patent: Aug. 30, 2011

(54) METHODS, SYSTEMS, AND ARTICLES OF MANUFACTURE FOR ANALYZING INITIATIVES FOR A BUSINESS NETWORK

(75) Inventors: Anthony Bruce, Chevy Chase, MD (US); Jim Manzi, Washington, DC (US)

(73) Assignee: Applied Predictive Technologies, Arlington, VA (US)

( * ) Notice: Subject to any disclaimer, the term of this patent is extended or adjusted under 35 U.S.C. 154(b) by 2228 days.

(21) Appl. No.: 10/767,191

(22) Filed: Jan. 30, 2004

(51) Int. Cl.
*G06Q 10/00* (2006.01)
*G06Q 30/00* (2006.01)
(52) U.S. Cl. ........................................... 705/7.29
(58) Field of Classification Search ............... 705/7.26, 705/7.33
See application file for complete search history.

(56) References Cited

U.S. PATENT DOCUMENTS

| | | | |
|---|---|---|---|
| 4,972,504 A | 11/1990 | Daniel et al. | 705/10 |
| 5,138,638 A | 8/1992 | Frey | 377/6 |
| 5,227,874 A | 7/1993 | Von Kohorn | 705/10 |
| 5,245,533 A | 9/1993 | Marshall | 705/10 |
| 5,315,093 A | 5/1994 | Stewart | 235/381 |
| 5,406,477 A | 4/1995 | Harhen | |
| 5,613,217 A | 3/1997 | Hagstrom et al. | |
| 5,692,107 A | 11/1997 | Simoudis et al. | 706/12 |
| 5,826,252 A | 10/1998 | Wolters et al. | 707/1 |
| 6,055,524 A * | 4/2000 | Cheng | 706/23 |
| 6,078,891 A | 6/2000 | Riordan et al. | 705/10 |
| 6,321,206 B1 * | 11/2001 | Honarvar | 705/7 |
| 6,484,158 B1 | 11/2002 | Johnson et al. | 705/36 R |
| 6,553,352 B2 * | 4/2003 | Delurgio et al. | 705/400 |
| 6,708,156 B1 | 3/2004 | Von Gonten | 705/10 |
| 6,801,818 B2 | 10/2004 | Kopcha | 700/97 |

(Continued)

OTHER PUBLICATIONS

Avery, Jill, Thomas J. Steenburgh, John Deighton, and Mary Caravella. Adding Bricks to Clicks: The Contingencies Driving Cannibalization and Complementarity in Multichannel Retailing. Feb. 2009. Havard Business School. Jan. 7, 2009 <http://papers.ssrn.com/sol3/papers.cfm?abstract_id=995647>.*

(Continued)

*Primary Examiner* — Jonathan G Sterrett
*Assistant Examiner* — Folashade Anderson
(74) *Attorney, Agent, or Firm* — Eric L. Sophir; SNR Denton US LLP

(57) ABSTRACT

A system, method, and article of manufacture is disclosed for analyzing a business initiative for a business network including business locations separated into control group sites and test sites that have implemented the business initiative for a predetermined test period. Each of the sites have an associated set of attributes reflecting various characteristics corresponding to the respective site, such as geographical location, size of business location, number of employees, etc. In one aspect of the invention, a process is performed that collects a performance value for each of the test and control group sites reflecting a level of performance of each respective sites during the test period. The performance of the test sites is then measured relative to the performance of the control sites over the same time period. The process may segment the performance values for each test site attribute to identify those attributes that have a greater impact on the performance values of the test sites than other attributes. Further, the process configures a model for predicting the performance values of the test sites using the identified attributes and determines whether the model accurately predicts these performance values. If so, the process applies the model to the non-tested sites to predict the performance values of these sites. Based on the predicted performance values, a user may select one or more of the sites to implement the business initiative.

19 Claims, 18 Drawing Sheets

U.S. PATENT DOCUMENTS

| | | | | |
|---|---|---|---|---|
| 6,934,748 | B1* | 8/2005 | Louviere et al. | 709/224 |
| 6,966,061 | B1 | 11/2005 | Vance et al. | 718/100 |
| 6,970,830 | B1 | 11/2005 | Samra et al. | 705/10 |
| 7,072,863 | B1* | 7/2006 | Phillips et al. | 705/36 R |
| 7,080,027 | B2* | 7/2006 | Luby et al. | 705/7.31 |
| 7,092,896 | B2* | 8/2006 | Delurgio et al. | 705/7.35 |
| 7,155,398 | B2 | 12/2006 | Thier | 705/7 |
| 7,308,497 | B2* | 12/2007 | Louviere et al. | 709/224 |
| 7,412,398 | B1* | 8/2008 | Bailey | 705/7.31 |
| 7,451,065 | B2* | 11/2008 | Pednault et al. | 703/2 |
| 7,526,434 | B2* | 4/2009 | Sharp | 705/7.29 |
| 7,546,246 | B1 | 6/2009 | Stamm et al. | 705/7 |
| 7,548,879 | B2 | 6/2009 | Cash et al. | 705/35 |
| 7,599,848 | B2 | 10/2009 | Wefers et al. | 705/7 |
| 7,689,456 | B2 | 3/2010 | Schroeder et al. | 705/10 |
| 7,729,931 | B1* | 6/2010 | Tobin | 705/7.34 |
| 7,904,327 | B2* | 3/2011 | Phelan et al. | 705/14.18 |
| 2001/0032105 | A1* | 10/2001 | Frye et al. | 705/7 |
| 2001/0042003 | A1 | 11/2001 | Tanaka | 705/10 |
| 2002/0069099 | A1 | 6/2002 | Knox et al. | 705/8 |
| 2002/0133250 | A1 | 9/2002 | Kopcha | 700/95 |
| 2002/0169665 | A1 | 11/2002 | Hughes et al. | 705/14 |
| 2003/0018510 | A1 | 1/2003 | Sanches | 705/9 |
| 2003/0023841 | A1 | 1/2003 | Atherton et al. | 713/1 |
| 2003/0046125 | A1 | 3/2003 | Flores | 705/7 |
| 2003/0046126 | A1 | 3/2003 | Flores et al. | 705/7 |
| 2003/0050830 | A1 | 3/2003 | Troyer | 705/11 |
| 2003/0069659 | A1 | 4/2003 | Wada et al. | 700/108 |
| 2003/0069782 | A1 | 4/2003 | Chrisman et al. | 705/10 |
| 2003/0110080 | A1 | 6/2003 | Tsutani et al. | 705/14 |
| 2003/0130883 | A1 | 7/2003 | Schroeder et al. | 705/10 |
| 2003/0176931 | A1* | 9/2003 | Pednault et al. | 700/31 |
| 2003/0177055 | A1* | 9/2003 | Zimmerman et al. | 705/10 |
| 2003/0195793 | A1 | 10/2003 | Jain et al. | 705/10 |
| 2003/0212584 | A1 | 11/2003 | Flores | 705/7 |
| 2004/0054511 | A1* | 3/2004 | Turner et al. | 703/6 |
| 2004/0143477 | A1 | 7/2004 | Wolff | 705/9 |
| 2004/0210471 | A1 | 10/2004 | Luby et al. | 705/10 |
| 2004/0243485 | A1 | 12/2004 | Borenstein et al. | 705/27 |
| 2004/0260624 | A1 | 12/2004 | Chan et al. | 705/26 |
| 2005/0039206 | A1* | 2/2005 | Opdycke | 725/35 |
| 2005/0055275 | A1 | 3/2005 | Newman et al. | 705/14 |
| 2005/0075921 | A1* | 4/2005 | Hayes-Roth | 705/10 |
| 2005/0108082 | A1 | 5/2005 | Jenkinson | 705/10 |
| 2005/0200476 | A1 | 9/2005 | Forr et al. | 340/539 |
| 2006/0105775 | A1 | 5/2006 | Von Kaenel et al. | 455/456 |
| 2006/0195370 | A1* | 8/2006 | Howarth | 705/28 |

OTHER PUBLICATIONS

Eastlack, Joseph O., Jr., Rao, Ambar G., Dodson, Joe, & McNiven, Malcolm A.. (1989). Advertising Experiments at the Campbell Soup Company; Commentaries; Reply. Marketing Science, 8(1), 57.*
Kimes, Sheryl E., & Fitzsimmons, James A.. (1990). Selecting Profitable Hotel Sites at La Quinta Motor Inns. Interfaces, 20(2), 12.*
Rogers, David. (1992). A Review of Sales Forecasting Models Most Commonly Applied in Retail Site Evaluation. International Journal of Retail & Distribution Management, 20(4), 3.*
Applied Predictive Technologies Announces Launch of Adaptive Marketing Suite for Online and Brick-and-Mortar Channels. (Jan. 2). PR Newswire,1.*
Boosting Customer Response: Mercer Management Consulting and Applied Predictive Technologies Form Marketing Alliance. (Mar. 12, 2001). PR Newswire,1.*
Deborah Szynal. (Apr. 2002). New to you. Marketing News, 36(7), 23.*
Amato-McCoy, D.. (Apr. 2010). Focus on: Business Analytics. Chain Store Age, 86(4), 71-73.*
Bolton, Ruth N., & Drew, James H.. (1991). A Longitudinal Analysis of the Impact of Service Changes on Customer Attitudes. Journal of Marketing, 55(1), 1.*
"An Application of Clustering for Strategic Group Analysis," Author: Kathryn Rudie Harrigan, Source: Strategic Management Journal, vol. 6, No. 1 (Jan.-Mar. 1985), pp. 55-73.
"Idea Management in a Shared Drawing Tool," Iva M. Lu and Marilyn M. Mantei, Proceedings of the Second European Conference on Computer-Supported Cooperative Work Bannon, L. Robinson, M. & Schmidt, K. (Editors), Sep. 25-27, 1991, Amsterdam, The Netherlands.
"A process for evaluating retail store efficiency: a restricted DEA approach," Thomas, Rhonda, R.; Barr, Richard S.; Cron, William L.; Slocum Jr., John W.; International Journal of Research in Marketing 15, (1998) pp. 487-503.
"Marketing's Contribution to the Implementation of Business Strategy: An Empirical Analysis," Author(s): Stanley F. Slater and Eric M. Olson Source: Strategic Management Journal, vol. 22, No. 11 (Nov. 2001), pp. 1055-1067.
"What Have We Learned About Generic Competitive Strategy? A Meta-Analysis," Author(s): Colin Campbell-Hunt, Source: Strategic Management Journal, vol. 21, No. 2 (Feb. 2000), pp. 127-154.
"The New Product Development Process for Commercial Financial Services," Scott J. Edgett, Industrial Marketing Management 25, pp. 507-515 (1966).
"Cluster Analysis in Test Market Selection," Author(s): Paul E. Green, Ronald E. Frank, Patrick J. Robinson, Source: Management Science, vol. 13, No. 8, Series B, Managerial (Apr. 1967), pp. B387-B400.
"The short-term effect of store-level promotions on store choice, and the moderating role of individual variables", Pierre Volle, Journal of Business Research 53 (2001), pp. 63-73.
"An Empirical Analysis of Strategy Types," Author(s): Craig Galbraith and Dan Schendel, Source: Strategic Management Journal, vol. 4, No. 2 (Apr.-Jun. 1983). pp. 153-173.
"Advertising Experiments at the Campbell Soup Company," Eastlack Jr., Joseph O.; Rao, Ambar G., Marketing Science, vol. 8, No. 1 (Winter, 1989), pp. 57-71.
"New Product Models: Practice, Shortcomings and Desired Improvements," Vijay Mahajan, Jerry Wind, Journal of Product Innovation Management, 1992; 9:128-139.
"An Investigation into the New Product Process: Steps, Deficiencies, and Impact," Robert G. Cooper, Elko J. Kleinschmidt, Journal of Product Innovation Management, 1986, 3:71-85.
"Pre-Test-Market Models: Validation and Managerial Implications," Glen L. Urban; Gerald M. Katz, Journal of Marketing Research, vol. 20, No. 3 (Aug. 1983) pp. 221-234.

* cited by examiner

FIG. 4

🔲 ACTIVITY ANALYZER - MICROSOFT INTERNET EXPLORER　　　　　　　　　　　　　　　□ 🗗 ✕
aptRetailer NETWORK EXPLORER | MICRO MARKETER | NETWORK PLANNER | EXPERIMENTAL DESIGN　　　HOME | HELP | LOGOFF
⋯▶ ACTIVITY ANALYZER | BENCHMARKER | CLUSTER BUILDER　　　　　　　　　　　aptRetailer DEMO

TEST INITIATIVE.　　　　　　　　　　　　　　　　　　　　　　　　　　　　　　　CREATE COMMENTS>>

SELECT THE TYPE OF REPORT TO VIEW: ⟵ 510
  ○ SUMMARY   METRIC     SALES $ ▽  WEEKLY ▽ ?
  ● DETAILED   CATEGORY: TOTAL  EDIT CATEGORY « ⟵ 520
           ☑ COMPARE USING % OF LAST YEARS PERFORMANCE

SELECT THE TIME FRAMES FOR COMPARISON:
THE DATES DISPLAYED HERE ARE DIFFERENT THAN THE DATES SAVED IN
THIS ACTIVITY. USE THE CHECKBOX TO RESTORE THE DATES IF NEEDED.

TEST START DATE:     DEC ▽ 26 ▽ 2002 🗓
TEST END DATE:      FEB ▽ 2 ▽ 2003 🗓  ⟵ 540
          ☐ RESTORE SAVED ACTIVITY DATES

COMPARISON START DATE:  SEP ▽ 3 ▽ 2002 🗓
COMPARISON END DATE:    SEP ▽ 30 ▽ 2002 🗓
          SELECT DATES THAT DO NOT
          OVERLAP THE TEST DATES.

SELECT THE CONTROL GROUP FOR THESE 27 SITES:
CUSTOM CONTROL SELECTION... ▽
USING QUERIES ▽ ⟵ 560

REMOVE OUTLIER SITES?
YES, 95% CONFIDENCE ▽ ⟵ 550
WHEN REMOVED, OUTLIER SITES ARE DISPLAYED
SEPARATELY FROM THE TEST AND CONTROL SITES.

<<CANCEL    OR    ANALYZE ACTIVITY >>

FIG. 5

| TEST SITE | PERFORMANCE METRIC | ATTRIBUTES ||||||
|---|---|---|---|---|---|---|---|
| | | ATTRIBUTE 1 (NO. OF COMPETITOR STORES WITHIN 10 MILES) | ATTRIBUTE 2 (AVG. DISTANCE TO BUSINESS LOCATION IN NETWORK) | ATTRIBUTE 3 (AVG. MO. RENT) | ATTRIBUTE 4 (% POPULATION 18-24 W/N 5 MILES) | ... | ATTRIBUTE T |
| TS-1 | 15% (AVG. SALES INCREASE) | .81 | 12.02 | 15650 | .083 | ... | 1.34 |
| TS-2 | 10% (AVG. SALES INCREASE) | .96 | 10.13 | 12670 | .064 | ... | 1.56 |
| ... | ... | ... | ... | ... | ... | ... | ... |
| TS-X | (4%) (AVG. SALES INCREASE) | 1.78 | 8.32 | 16345 | .033 | ... | 2.45 |

*FIG. 8*

SITE CHARACTERISTICS - MICROSOFT INTERNET EXPLORER aptRetailer | NETWORK EXPLORER | MICRO MARKETER | NETWORK PLANNER | EXPERIMENTAL DESIGN     HOME | HELP | LOGOFF ⇢ ACTIVITY ANALYZER | BENCHMARKER | CLUSTER BUILDER     aptRetailer DEMO

ANALYZE SITE CHARACTERISTICS     CREATE COMMENTS>>

EXPORT TO:   ACTIVITY:   TEST INITIATIVE   CONTROL TYPE: ALL OTHER OPEN SITES   🖶 PRINT REPORT
    PROGRAM / TEST PERIOD: 10/19/2003 - 10/25/2003   METRIC: ? SALES $: WEEKLY
    COMPARISON PERIOD: 09/06/2003 - 10/11/2003   CATEGORY: TOTAL

VIEW: ALL* ATTRIBUTES    1130    VIEW CHARACTERISTICS BY ABSOLUTE CHANGE »
CALCULATE DRIVER SIGNIFICANCE   UPDATE »   ? GET MORE INFO     1120   107 ITEMS
* ONLY ITEMS FOR WHICH YOU HAVE PERMISSIONS WILL BE DISPLAYED

| ATTRIBUTE NAME | TEST GROUP CORRELATION | CONTROL GROUP CORRELATION | IMPORTANCE FACTOR | ↓ P-VALUE |
|---|---|---|---|---|
| ? WEATHER - TOTAL PRECIP - 2002 | 38.45% | -13.16% | 3,098 | - |
| ? LATITUDE | -44.72% | -0.39% | 2,661 | - |
| ? DEMOG - ETHNICITY - % HISPANIC - 3 MI | 28.54% | -15.38% | 2,635 | - |
| ? DEMOG - POP - MEDIAN AGE - TA | 41.23% | -2.45% | 2,621 | - |
| ? DEMOG - ETHNICITY - % HISPANIC - 5 MI | 26.76% | -16.69% | 2,608 | - |
| ? DEMOG - ETHNICITY - % HISPANIC ANCESTRY - TA | 28.70% | -14.61% | 2,599 | - |
| ? WEATHER - AVG TEMP - 2002 | 43.20% | 1.50% | 2,503 | - |
| ? DEMOG - ETHNICITY - % HISPANIC - 1 MI | 27.09% | -12.65% | 2,213 | - |
| ? TOTAL # OF SECONDARY COMPETITORS - 5 MI | 37.44% | 2.54% | 2,095 | - |
| ? DEMOG - POP - MEDIAN AGE - 1 MI | 38.06% | 0.58% | 2,087 | - |
| ? VEHICULAR TRAFFIC COUNT | 31.18% | -2.92% | 2,036 | - |
| ? DEMOG - % HHOLD INC $35,000 - $49,000 - TA | 36.00% | -2.59% | 2,005 | - |
| ? DEMOG - HHOLDS - INC - %$035,000 - $049,999 5MI - % | 30.44% | -2.17% | 1,957 | - |
| ? DEMOG - POP - MEDIAN AGE - 3 MI | 37.75% | 6.45% | 1,878 | - |
| ? DEMOG - HHOLDS - 3 MI | 22.52% | -6.88% | 1,765 | - |
| ? LONGITUDE | 14.22% | -15.13% | 1,762 | - |
| ? DEMOG - POP - MEDIAN AGE - 5 MI | 37.14% | 8.28% | 1,732 | - |
| ? NEWLY REMODELED STORE? (Y/N) | -35.56% | -7.54% | 1,682 | - |

1100   « RETURN TO AGGREGATE RESULTS     OR     COMPARE MULTIPLE ATTRIBUTES »

| SITE ID | SITE NAME | ACTUAL ACTIVITY PERFORMANCE | ACTUAL PERFORMANCE 02/03/2002-02/01/2003 | ESTIMATED PERFORMANCE 02/03/2002-02/01/2003 | ESTIMATED CHANGE IN PERFORMANCE 02/03/2002-02/01/2003 |
|---|---|---|---|---|---|
| 02202 | WILLOW PASS ROAD | — | 1,069,219.71 | 3,395,403.46 | 217.56% |
| 02101 | 9993 WESTPARK AVE | — | 1,457,841.05 | 4,608,634.31 | 216.13% |
| 00488 | 188 EAGLE RIDGE DRIVE | — | 1,025,689.38 | 3,213,515.78 | 213.30% |
| 00190 | 64375 QUORUM DRIVE | — | 1,111,264.90 | 3,433,107.62 | 208.94% |
| 02153 | 1910 WELLS RD SP 1947 | — | 629,380.38 | 1,932,203.55 | 207.00% |
| 03001 | 3393 DONNELL DR | — | 1,076,190.50 | 3,285,074.56 | 205.25% |
| 00211 | 9695 GULF FREEWAY | — | 1,454,368.95 | 4,396,929.60 | 202.33% |
| 00568 | 327 INDIAN RIVER PARKWAY | 227.39 | 1,331,140.36 | 4,020,760.15 | 202.05% |
| 03004 | 3737 BRANCH AVE | — | 497,405.31 | 1,508,817.21 | 201.11% |
| 02076 | 612 SLIDE-BX 69213 | — | 1,255,944.53 | 3,763,344.55 | 199.64% |
| 02194 | 712 LEXINGTON AVENUE | — | 1,038,450.67 | 3,107,151.99 | 199.21% |
| 02100 | 907 COLUMBIA CENTER | — | 1,295,071.49 | 3,825,633.32 | 195.40% |
| 02259 | 311 WACCAMAW BLVD #113 | — | 1,069,172.18 | 3,152,794.84 | 194.88% |
| 03026 | 6711 GOVENOR RITCHIE HWY | — | 843,730.87 | 2,462,814.08 | 191.90% |
| 03020 | 991 PIKE BUCKEYSTOWN PIKE | — | 964,633.26 | 2,784,377.43 | 188.65% |
| 02267 | 1029 INDUSTRIAL PARK DR., STE 4 | — | 908,458.13 | 2,616,878.37 | 188.06% |
| 02223 | 2919 SOUTHDALE SC | — | 560,075.86 | 1,574,566.02 | 181.13% |
| 02183 | 339 SUNRISE MALL | — | 2,863,284.45 | 7,970,490.07 | 178.37% |
| 02235 | 1179 BURNSVILLE CTR | — | 1,610,624.58 | 4,349,545.80 | 170.05% |
| 02034 | 6393 NEWBERRY RD-SPC D3 | — | 1,019,207.13 | 2,742,448.28 | 169.08% |
| 02157 | 491 E ALTAMONTE DR STE 337 | — | 440,410.58 | 1,179,590.31 | 167.84% |
| 02200 | 3 EMBARCADERO CENTER SUITE 41 | — | — | — | 165.48% |
| 02181 | 264 BRIDGEWATER COMMONS | — | 1,120,932.55 | 2,963,654.12 | 164.39% |
| 00329 | 6668 HOLMES AVE | — | 898,594.49 | 2,657,465.99 | 162.35% |
| 02158 | 1031 SOUTHSIDE, STE 1126 | — | 394,974.63 | 1,033,624.14 | 161.69% |
| 01335 | 711 SUMMIT ST | — | 1,118,199.33 | 2,923,441.81 | 161.44% |
| 00183 | 4533 VALLEY VIEW LANE | — | 1,481,470.03 | 3,860,223.75 | 160.70% |
| 02065 | 2024 INDEPNDNCE CTR | — | 577,043.06 | 1,499,731.93 | 159.90% |
| 02234 | 290 SOUTH AVENUE | — | 436,816.52 | 1,133,321.45 | 159.45% |
| 02167 | 297 WESTFARMS MALL | — | 784,089.03 | 2,021,215.42 | 157.78% |
| 02088 | 9424 SW WASHNGTN SQ | — | 1,005,614.50 | 2,583,386.71 | 156.90% |
| 03016 | 42 WHITTEN RD | — | 1,046,147.22 | 2,675,760.84 | 155.77% |

1620 — ESTIMATED CHANGE IN PERFORMANCE column
1630 — ACTUAL PERFORMANCE column
1610 — SITE NAME column

FIG. 17

ESTIMATES FOR "ALL STORES" - MICROSOFT INTERNET EXPLORER

ESTIMATES FOR "ALL STORES" GROUPED BY REGION

EXPORT TO: 🗎                    🖨 PRINT REPORT

VIEW ESTIMATES
FOR SITES IN: ALL STORES
GROUP SITES BY: REGION    ▷ UPDATE ≫

| VALUE | NUM. OF SITES | AVG. ACTUAL ACTIVITY PERFORMANCE | AVG. ACTUAL PERFORMANCE 02/03/2002-02/01/2003 | AVG. ESTIMATED PERFORMANCE 02/03/2002-02/01/2003 | AVG. ESTIMATED CHANGE IN PERFORMANCE 02/03/2002-02/01/2003 |
|---|---|---|---|---|---|
| REGION 16 | 139 | 140.87 | 726,280.33 | 1,087,011.83 | 49.67% |
| REGION 2 | 84 | 8.77 | 880,177.21 | 1,263,513.94 | 43.55% |
| REGION 12 | 151 | 0.21 | 904,436.97 | 1,281,487.39 | 41.69% |
| REGION 9 | 81 |  | 775,785.04 | 1,098,688.22 | 41.62% |
| REGION 5 | 123 | 10.03 | 820,255.08 | 1,161,282.39 | 41.58% |
| REGION 4 | 135 | 67.75 | 759,843.55 | 1,068,249.83 | 40.59% |
| REGION 10 | 92 | 40.76 | 898,875.27 | 1,221,043.35 | 35.84% |
| REGION 15 | 104 | 12.54 | 699,475.51 | 945,099.31 | 35.12% |
| REGION 3 | 126 | 6.64 | 653,393.83 | 873,311.42 | 33.66% |
| REGION 8 | 124 |  | 819,345.66 | 1,088,370.77 | 32.83% |
| REGION 1 | 105 | -1.90 | 775,368.24 | 992,037.92 | 27.95% |

1710, 1720, 1730, 1740

METHODS, SYSTEMS, AND ARTICLES OF MANUFACTURE FOR ANALYZING INITIATIVES FOR A BUSINESS NETWORK

FIELD OF THE INVENTION

This invention relates to business initiative analysis systems, and more particularly, to methods, systems, and articles of manufacture for performing a segmented initiative analysis for initiatives implemented at selected business locations in order to identify in which other locations to implement the initiative.

BACKGROUND OF THE INVENTION

For as long as retailers have been selling products and services, they have been seeking ways to increase profits. Accordingly, many retailers create new initiatives that they believe will have a positive impact on sales. These initiatives usually cover various aspects of business operations that drive profits. For example, retailers may change product prices, move products to different locations of a sales floor, change the amount of space allocated to each product, test new products, add or reduce sales staff, introduce new concepts (e.g., in-store kiosks), remodel older stores, and test new marketing campaigns. Retailers may test these new initiatives in selected test locations (i.e., certain stores) and subsequently determine whether to introduce the initiatives to remaining business locations based on the success of the initiatives at the selected test locations. Historically, retailer management have used business instinct and/or anecdotal evidence to assess the success of the initiatives in order to make a decision whether to implement the initiatives at the rest of its business locations.

In recent years, however, some retailers have become more structured and analytical in their set up and analysis of tests. These retailers collect performance metrics, such as sales and gross profit data from the test locations and analyze the data using conventional software products, such as spreadsheet or statistical software packages. Retailers may measure the change in the performance metrics at the locations that introduced the new initiatives relative to a change in the same metrics at a control group of locations that did not implement the initiatives. In doing so, the retailers attempt to identify the impact of the initiatives on the performance metrics in order to determine whether they provide a positive return on investment. Accordingly, these retailers can make an informed decision whether to extend the concept to remaining locations in a business network.

Even the most advance retailers, however, are only able to assess the average impact of the tested initiative. In other words, a retailer that tests a new store layout in 20 stores, can only interpret the average sales impact of the new layout in those 20 stores. Further, they may lack the ability to understand how that average impact varied among different types of stores and which of the other non-tested stores in their business network would benefit from implementation of the new layout. For example, the retailer will not be able to determine whether, based on the 20-store test, the new layout works better in certain demographic or competitive environments, in certain locations (e.g., shopping centers), or in larger or smaller stores. Because of these shortcomings, a retailer may not be able to make an informed business decision regarding which non-tested stores should implement the new layout. Instead, the retailer must make a global decision that affects the entire business network. That is, either roll out the tested initiative to all stores in the network or eliminate the initiative altogether.

Often, an initiative will work well in some location types and not in others. It would therefore be preferable if the retailer could only extend the initiative to those stores most likely to benefit from the initiative instead of extending the imitative to either all stores or none at all.

SUMMARY OF THE INVENTION

It is therefore desirable to have an integrated system that allows a retailer to focus investments on locations that are most likely to succeed through the implementation of a tested initiative. Accordingly, there is a need for a system and method that segments the results of a tested initiative to identify types of business locations that have responded well to the initiative and use the segmented results to assess the potential application of the tested initiative at other locations.

In one aspect of the invention, a method is provided for analyzing a business initiative for a business network including business locations separated into test sites that have implemented the business initiative for a predetermined test period and control sites that did not have the initiative implemented. Each of the sites have an associated set of attributes reflecting various characteristics corresponding to the respective site, such as geographical location, size of business location, number of employees, etc. The method includes collecting a performance value for each of the test sites and control group sites during a predetermined period of time when the business initiative was tested at the test sites, wherein the performance value represents a level of performance associated with the respective site. The performance value of the test sites is measured relative to the performance in the control stores over the same time period. Also, the method includes segmenting the performance values of the test sites for each attribute to identify those store attributes most strongly related to performance during the initiative and estimating the performance values for every other location if each were to implement the tested initiative based on the relevant attributes of each site. The method may also include determining a set of non-test sites to implement the tested business initiative based on the estimated performance values and displaying the determined set of non-test group sites.

In another aspect of the invention, a system is provided for analyzing a business initiate for a business network including business locations having sites including test sites that have implemented the business initiative and non-test group sites that have not implemented the business initiative. Each site is associated with a set of attributes and the system includes a client associated with the business network and a server. Based on requests from the client, the server is configured to identify a set of test sites that have higher business levels of performance than other test sites during the test period. Also, the server may configure a model that accurately predicts the performance of the non-test group sites if they were to implement the business initiative based on selected attributes associated with the set of test sites and rank the non-test group sites based on their respective predicted performance. A user operating the client may then select a set of the non-test group sites to actually implement the business initiative.

Further, a method is provided for analyzing a business initiative for a business network including business locations including test sites that have implemented the business initiative during a predetermined test period and non-test group sites that have not implemented the initiative. Each site is associated with a set of attributes. The method may include receiving, from a server, a list of the attributes ranked based on each attribute's impact on performance values associated with the test sites during the test period. The method further includes configuring a model to predict the performance value of the sites based on the ranked list of attributes and instructing the server to execute the model for the test sites. Moreover, the method may include receiving results of the executed model, whereby the results include quantitative measures of the model's ability to accurately predict the performance levels of the test sites. Based on a determination that the model accurately predicts the performance levels of the test sites, the method instructs the server to apply the model to the non-test group sites to predict the performance levels of the non-test group sites. Also, the method includes receiving a list of non-test group sites ranked based on each non-test group site's predicted performance level.

In yet another aspect of the invention, a system is provided for analyzing a business initiative for a business network including business locations having sites including test sites that have implemented the business initiative during a predetermined test period and non-test group sites that have not implemented the business initiative, whereby each of the sites is associated with a set of attributes. The system may include a memory having program code including program code for determining the impact of each of the attributes on performance values of the test sites during the test period. Further, the memory includes program code for configuring a model, based on user input associated with the attributes, that predicts performance values of the test sites in relation to actual performance values of the test sites during the test period. The memory also includes program code for executing the model for the test sites to produce results reflecting the model's ability to accurately predict the performance values of the test sites. Also, the memory includes program code for reconfiguring the model based on additional user input associated with the attributes and program code for executing the model for the non-test group sites to produce predicted performance values for the non-test group sites when implementing the business initiative. The system further includes a processor for executing the program code.

Moreover, a method is provided by analyzing a business initiative for a business network including a first set of test business locations that have implemented the business initiative for a predetermined test period and a second set of non-test business locations that have not implemented the business initiative. The method includes predicting a performance of each of the test business locations using actual performance values collected from the test business locations and attributes associated with each of the test business locations. Also, the method includes determining whether the predicted performance accurately reflects actual performance of the test business locations and predicting a performance of each of the non-test business locations based on a determination that the performance of the test business locations are accurately predicted. Based on the predicted performance of those business locations, the method selects a subset of the non-test business locations for implementing the business initiative.

In another aspect of the invention, a method is provided for analyzing a business initiative for a business network including business locations including test sites that have implemented the business initiative for a predetermined test period and non-test group sites that did not implement the business initiative. Each of the sites have an associated set of attributes reflecting various characteristics. The method includes determining a set of control group sites from the non-test group sites and collecting a performance value for each of the test and non group sites reflecting a level of performance of each respective sites. Further, the method includes separating, for each attribute, the test site performance values into fragments based on values for the attribute for each test site. Also, the method includes separating, for each attribute, the control group site performance values into fragments based on values for the attribute for each control group site. The method further includes analyzing, for each attribute, the performance value of each test site fragment with the performance value of a corresponding control group site fragment and determining a strength of the relationship between the attribute and the performance of the test sites based on the analysis. Moreover, the method includes configuring a model using the attributes and at least one of the determined strength relationships and applying the model to the test site performance values to produce first results reflecting estimates of the performance values of the test sites. Additionally, the method includes reexecuting the model for non-test group sites reflecting sites in the business network that have not implemented the initiative to produce second results reflecting estimates of performance values for the non-test group sites if these sites were to implement the tested initiative and determining which non-test group sites to actually implement the tested initiative based on the second results.

In another aspect of the invention, a method is provided for predicting the performance of a target business location when implementing a tested business initiative. The method includes receiving feedback associating an implementation of the business initiative at a test business location. Further, the method includes predicting a likelihood of the business initiative having a positive impact on the target business location based on a model that produces quantitative performance data associated with the business initiative and is constructed using one or more attributes associated with the test business location. Also, the method includes determining whether the target business location should implement the business initiative based on the predicted likelihood, whereby the target business location is included in a set of business locations that may be selected to implement the business initiative.

Additional aspects of the invention will be set forth in part in the description which follows, and in part will be obvious from the description, or may be learned by practice of methods, systems, and articles of manufacture consistent with features of the present invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

FIG. 4 shows a screen shot of an exemplary test site selection web page, consistent with certain aspects of the present invention;

FIG. 5 shows a screen shot of an exemplary analysis set up web page, consistent with certain aspects of the present invention;

FIG. 8 shows an exemplary test site attribute table, consistent with certain aspects of the present invention;

FIG. 11 shows a screen shot of an exemplary attribute table web page, consistent with certain aspects of the present invention;

FIG. 13 shows a screen shot of an exemplary model selection web page, consistent with certain aspects of the present invention;

FIG. 14 shows a screen shot of an exemplary model results web page, consistent with certain aspects of the present invention;

FIG. 16 shows an exemplary business location analysis table, consistent with certain aspects of the present invention; and FIG. 17 shows an exemplary business region analysis table, consistent with certain aspects of the present invention.

DETAILED DESCRIPTION

Figure 1:
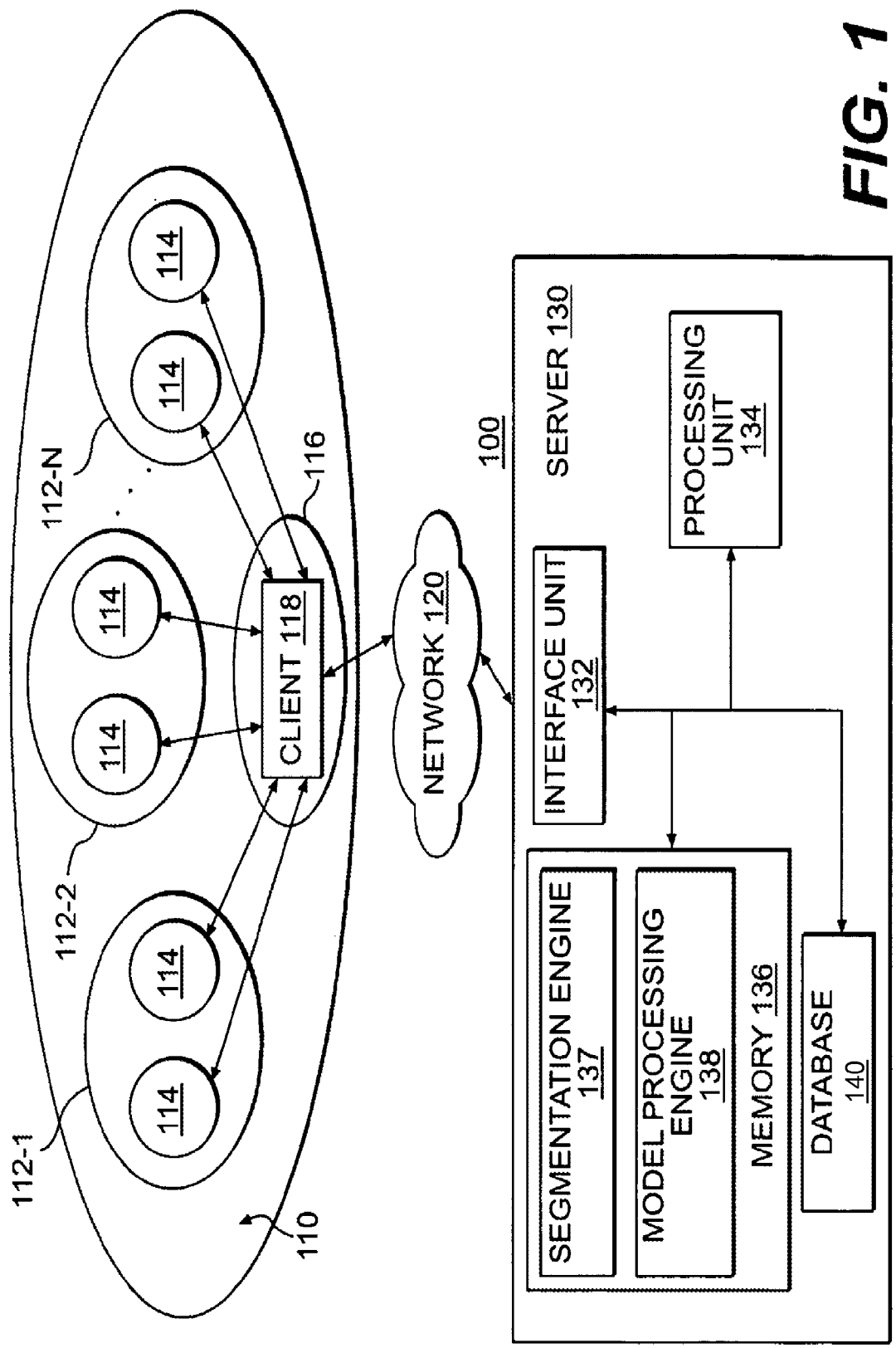
FIG. 1 illustrates an exemplary system environment in which methods, systems, and articles of manufacture, consistent with features and principles of the present invention may be implemented.

Methods, systems and articles of manufacture consistent with certain aspects of the present invention identify business locations that respond most positively to a tested initiative and build a model based on the common attributes of those identified test sites to predict the impact of the tested initiative on other locations in a business network.

In one aspect of the invention, a server is disclosed for performing one or more processes for analyzing a business initiative for a business network including business locations having a set of test sites that have implemented the business initiative for a predetermined test period and a set of control group sites that did not have the initiative implemented. Each of the sites have an associated set of attributes reflecting various characteristics corresponding to the respective site, such as geographical location, size of business location, number of employees, etc. In one aspect of the invention, the server collects from a client a performance value for each of the test and control group sites reflecting a level of performance of each site during the test period. The server then calculates the change in performance in the test sites during the test period, relative to the change in performance in the control group sites over the same time period. The server may segment the performance values for each test site attribute to identify those attributes that have a greater impact on the performance values of the test sites than other attributes. Further, the system configures a model for predicting the performance values of the test sites using the identified attributes and determines whether the model accurately predicts these performance values. If so, the server applies the model to all non-tested sites (i.e., all sites in business network 110 excluding the test sites) to predict the performance values of each site. Based on the predicted performance values, a user operating the client or associated with the business network may select one or more of those sites to implement the business initiative.

Reference will now be made in detail to the exemplary aspects of the invention, examples of which are illustrated in the accompanying drawings. Wherever possible, the same reference numbers will be used throughout the drawings to refer to the same or like parts.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instructions or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

I. SYSTEM OVERVIEW

FIG. 1 illustrates an exemplary system environment 100 in which certain aspects related to the present invention may be implemented. As shown, system environment 100 may include a business network 110, network 120, and a server 130.

Business network 110 represents a network of businesses that provide similar products and/or services to customers. The businesses may be geographically dispersed. Business network 110 may include one or more business regions 112-1 to 112-N that represent different geographical locations, such as cities, counties, states, country regions, virtual boundaries having a predetermined bounded distance (e.g., 100 mile radius), and any other type of defined region within a particular location. Each region 112-1 to 112-N may include one or more business locations 114 that represent retailers that sell products and/or services associated with business network 110. For example, business network 110 may represent a grocery store chain that includes a plurality of stores geographically dispersed among a state of the United States. Each region 112-1 to 112-N may represent locations that include grocery stores in the chain (e.g., business locations 114) that are within a predetermined distance of one another (e.g., 100 mile radius).

Also included in business network 110 is business management unit 116, which represents a business entity that manages business network 110. For example, business management unit 116 may be an organization headquarters or a marketing division for business network 110. Unit 116 may include one or more clients 118 that are operated by one or more users associated with business network 110 that perform various management and/or marketing duties for business network 110. Following the above example, business management unit 110 may be a marketing division of the exemplary grocery store chain that determines which products and/or services each retailer location (e.g., 114) should provide.

In one aspect of the invention, client 118 may be one or more computer systems such as a desktop computer, workstation, laptop, personal digital assistant or any other similar computing system operated by a user. Client 118 may include a processor, associated memory, and other elements and functionalities available in computer systems (all not shown). These elements may include input/output devices, such as a keyboard, mouse, and display, although these input means may take other forms. Also, client 118 may include a network interface for communicating with external resources, such as network 120 and server 130. Further, client 118 may execute browser software that enables a user to request, receive, and render information from network 120.

Although FIG. 1 shows business network 110 including a single business management unit 116 (and accompanying client 118), each business location 114 may include a client 118 that is capable of accessing network 120 and server 130 to access and perform processes consistent with certain aspects related to the present invention. Further, although business network 110 is shown including a plurality of regions 112-1 to 112-N, network 110 may include business locations 114 that are all included within a single region.

Network 120 may be a shared, public, or private network and encompasses a wide area or local area. Network 120 may be implemented through any suitable combination of wired and/or wireless communication networks. For example, network 120 may be implemented through a Wide Area Network ("WAN"), Local Area Network ("LAN"), an intranet and/or the Internet. Further, network 120 may represent multiple networks, such as a wireless carrier network connected to the Internet.

Server 130 may be a computer system such as a desktop computer, workstation, or any other similar server side computing system that performs one or more server-side processes. In one aspect of the invention, server 130 may include, among other things, interface unit 132, processing unit, 134, memory 136, and database 140. Although server 130 is shown including elements 132-140, it may include additional computing elements, such as an input/output device (e.g., display, mouse, keyboard) that enables a user to access the data and software in server 130. In addition, server 130 may be a group of servers.

Interface unit 132 may be one or more hardware and/or software components that are configured to receive and send information from/to network 120. Interface unit 132 may include, or leverage, different types of software to control access to information maintained by server 130. For example, interface unit 132 may execute firewall software that controls access to information and processes provided by server 130 using one or more security protocols (e.g., password processing, encryption technologies, etc. The above listed functionalities are not intended to be limiting and interface unit 132 may perform other types of interface processes to facilitate the exchange of information between server 130 and network 120.

Processing unit 134 may be one or more processing devices that execute software processes stored in one or more memory devices, such as memory 136. Further, processing unit 134 may execute software processes stored internally, such as internal flash memory configured within processing unit 134.

Memory 136 may be one or more memory devices that store data and software programs that, when executed by processing unit 134, perform processes consistent with certain aspects related to the present invention. These programs may include segmentation engine 137, and model processing engine 138. Further, memory 136 may include server-side software applications that enable server 130 to create and provide content including information produced by other programs executed by processing unit 134, such as web server software. Alternatively, server 130 may leverage web server software that is located in another memory device (not shown) internal or external to server 130. The above software programs and functionalities are not intended to be limiting and memory 136 may be configured to store additional or fewer types of data and/or software programs that perform other processes consistent with server-side computing systems.

Database 140 may be one or more memory devices that store data and/or executable software that is used by server 130 to perform processes consistent with certain aspects related to the present invention. For example, database 140 may include one or more data structures (e.g., tables, maps, arrays, directories, etc.) that include data that is used by one or more of the software programs stored in memory 136 and executed by processing unit 134. Although server 130 shows database 140 and memory 136 as separate elements, the information and software stored in these elements may be combined in a single memory device. Also, memory 136 and/or database 140 may be located external to server 130 and accessible through network 120 or a dedicated back-end communication path, such as a Local Area Network (LAN).

II. INITIATIVE ANALYSIS PROCESS

Figure 2:
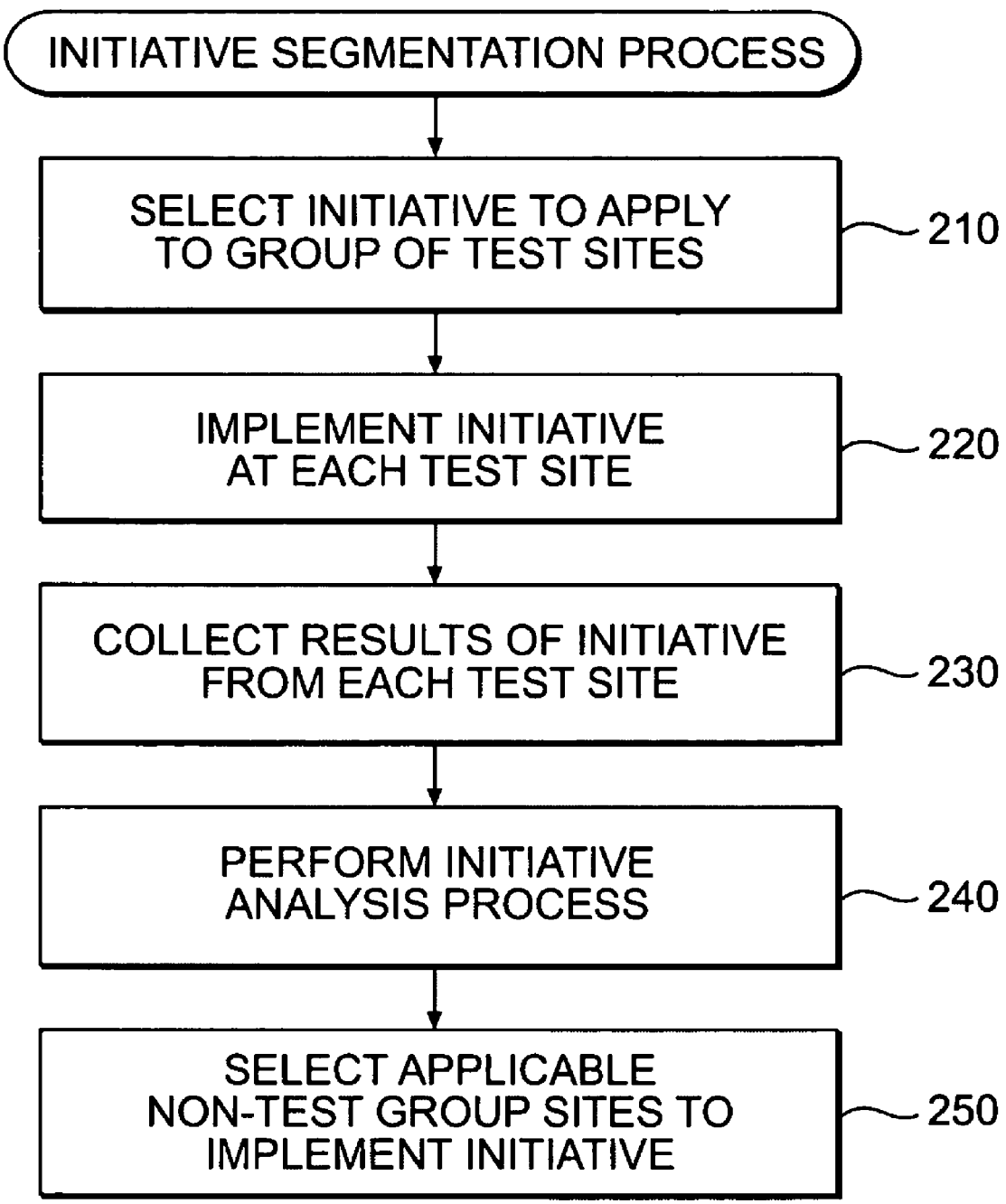
FIG. 2 illustrates a flowchart of an exemplary initiative segmentation process, consistent with certain aspects of the present invention.

Methods, systems, and articles of manufacturer consistent with aspects of the present invention enable one or more users of client 118 to access functionalities offered by server 130 to determine retail strategies associated with business network 110. For example, a user in business management unit 116 may execute browser software in client 118 to request analysis information regarding one or more initiatives implemented at one or more business locations 114. FIG. 2 shows an exemplary initiative segmentation process that may be performed by methods, systems, and/or articles of manufacture consistent with aspects of the present invention.

Initially, a user or users at business management unit 116 may create and select an initiative that is to be applied to a predetermined number of test sites reflecting a set of business locations 114 (e.g., thirty stores) included in business network 110 (Step 210). The proposed initiative may be a change in store layouts, offering different products and/or services, different marketing campaigns (e.g., advertising, etc.), and any other type of idea that may be implemented at the selected test sites.

The user of business management unit 116 may then direct the selected test sites to implement the proposed initiative (Step 220). The initiative may be implemented for a predetermined amount of time (e.g., three months, six months, etc.), which is also known as a test period. Alternatively, the initiatives may be implemented at the test sites indefinitely. During the test period, business management unit 116 may collect feedback results from each test site based on one or more performance metrics selected by unit 116 (Step 230). For example, business management unit 116 may request sales information, foot traffic (i.e., number of persons entering a business location), etc. from each test site during the test period and may request additional performance data for each test site for a period before the test period.

Once the appropriate feedback results are collected, a user at business management unit 116 may use client 118 to perform an initiative analysis process based on the results (Step 240). The initiative analysis process provides information regarding the effectiveness of the initiative at the test sites. Further, the initiative process provides information regarding a proposed effectiveness of the initiative if implemented in other non-tested business locations in business network 110 (i.e., retailer locations that did not implement the initiative). These other business locations may be referred to as non-test group sites. In one aspect of the invention, the initiative analysis process includes the exchange of information between client 118 (under the operation of a user) and server 130. For example, a user operating client 118 may use browser software to access a web site that is provided or leveraged by server 130 to perform the initiative analysis process. Accordingly, server 103 may provide content to client 118 that includes queries, data, and analysis information associated with the initiative analysis process.

A user, such as a manager at business management unit 116, or software processes may analyze the information provided by server 130 and selects one or more applicable non-test group sites to implement the initiative (Step 250). Accordingly, business management unit 116 determines and implements one or more strategies associated with the tested initiative in a selected number of business locations 114, and/or groups of locations, such as regions 112-1 to 112-N.

In certain aspects, client 118 may download information to server 130 associated with the results of the test initiatives at the test sites. Further, server 130 may receive, or retrieve, attributes associated with each business location 114 from client 118, such as store size, locations, sale data, types of products and/or service offered, location and distances of competing merchant sites, age of the business location, amount of a lease (if any), weather during the test period, staff information, etc. Alternatively, or in addition to the information provided by client 118, server 130 may execute software that determines, collects, and/or retrieves attribute information associated with business network 110, regions 112-1 to 112-N (e.g., population and demographic data, etc.), and business locations 114. The attribute information may be stored in database 140 for subsequent use by server 130 and/or client 118.

Figure 3A:
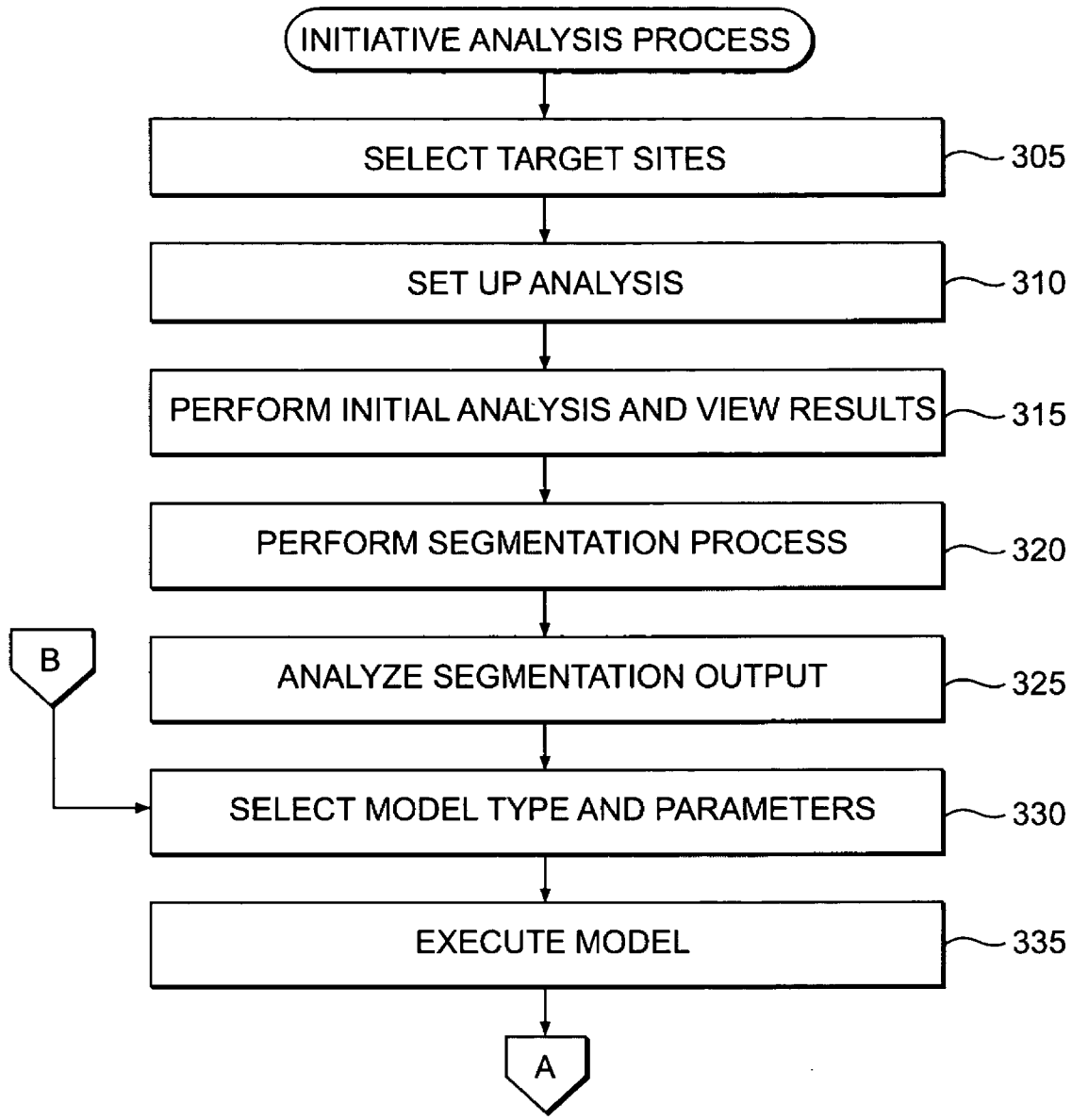
FIGS. 3A and 3B illustrate flowcharts of an exemplary initiative analysis process, consistent with certain aspects of the present invention.
Figure 3B:
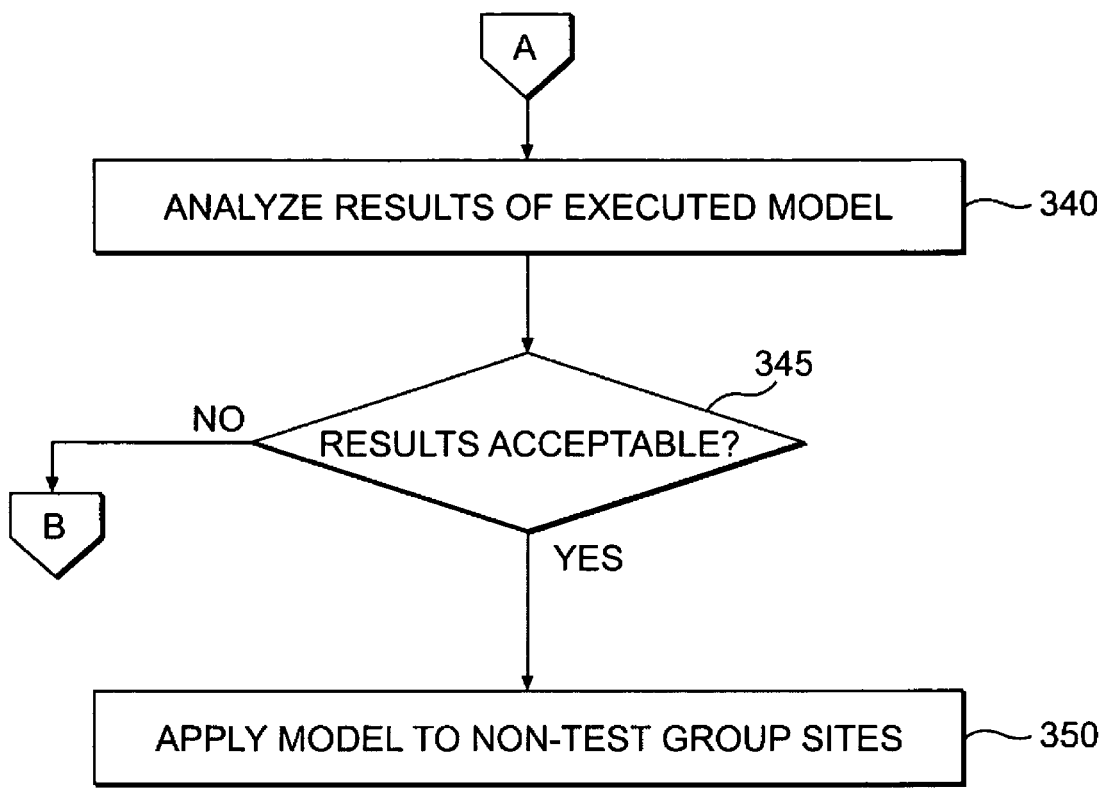
Figure 4:
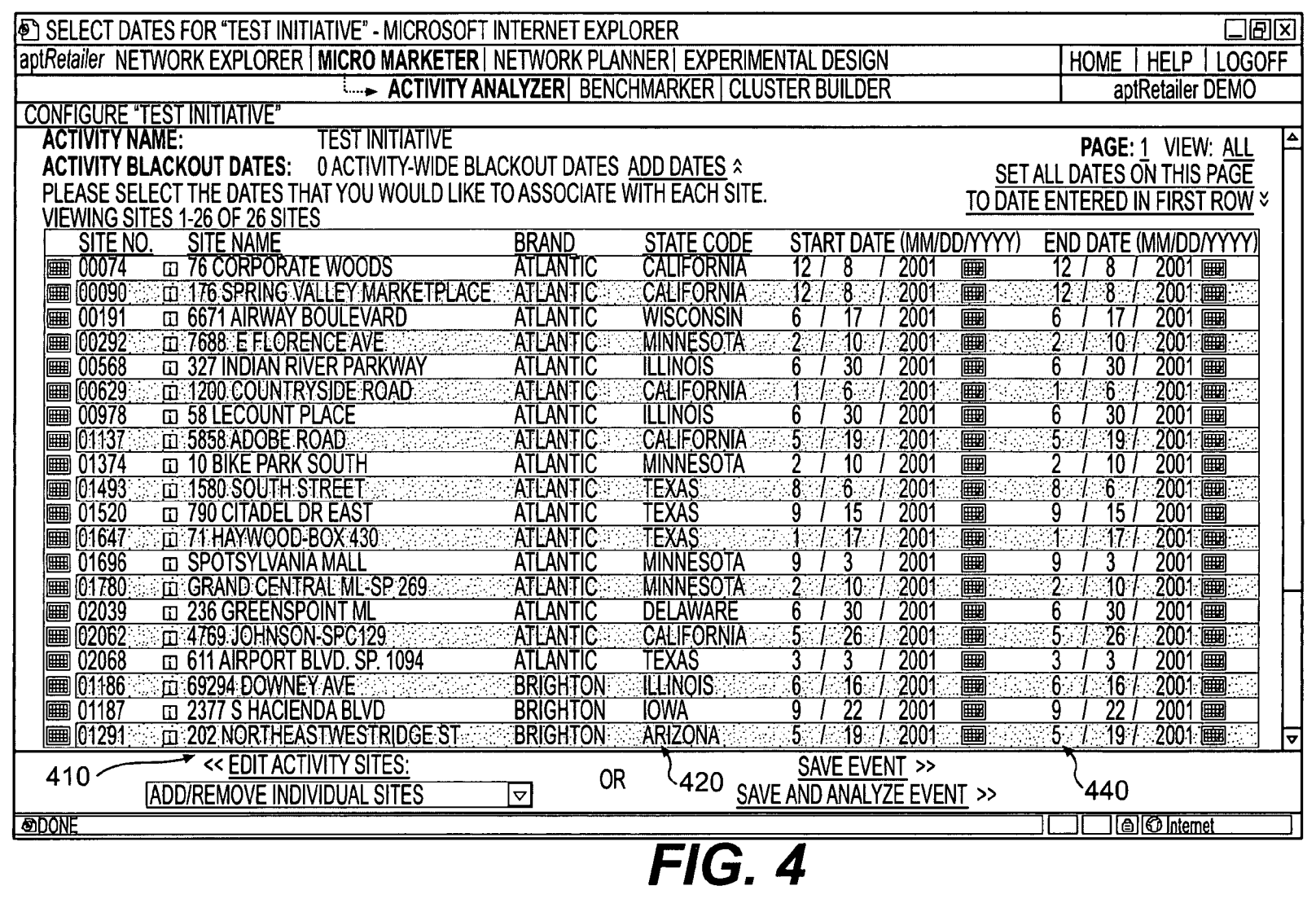

FIGS. 3A and 3B show a flowchart of an exemplary initiative analysis process, consistent with certain aspects of the present invention. As explained above in connection with FIG. 2, a user operating client 118 may access server 130 through browser software. In one aspect of the invention, server 130 may leverage web server software that creates and renders web page content that includes information associated with the initiative analysis process. For example, the initiative analysis process may begin with a user of client 118 receiving a web page including a list of target sites that implemented the initiative and provided feedback results to client 118. FIG. 4 shows an exemplary screen shot of a test site selection web page including a list of test sites 410, the location of each test site 420, the type of each test site (not shown), and a query section for proposed dates the user may select to perform an analysis 440. From this information, the user may select the test sites from which server 130 is perform an initiative analysis (Step 305).

Once the test sites are selected, server 130 may provide client 118 with information that enable the user to set up the initiative analysis (Step 310). FIG. 5 shows an exemplary screen shot of an analysis setup page that allows the user to define one or more items associated with the initiative analysis process. For example, in setting up the analysis, the user may select one or more performance metrics 510 from which the user wishes to use in its analysis. A performance metric may include sales data in dollars (change in average sales during the predetermined test time period), gross profit margins, number of products sold, and any other type of metric associated with the performance of the business locations 114. Further, server 130 may allow the user to select a product/service category 520 for the analysis, such as a type of product, all products, etc.

In addition to performance metrics and categories, the user may select time periods 540 from which the initiatives were implemented by the test sites. Also, the user may request that server 130 eliminates any initiative feedback data that appear to be anomalous by removing any outlier sites (selection 550). An outlier site has performance values that are too different than the rest of its respective test or control group. The user determines a threshold performance value beyond which a site is considered to be too different than its peers and thus deemed an outlier by server 130. By removing outlier test sites from consideration, the initiative analysis process does not consider the information for this test site during its analysis operations.

Additionally, or alternatively, the user may select a control group 560 of business locations in the network 110 that have not implemented the initiative. For example, the user may select to have all or a portion of the remaining business locations considered in the analysis process, or request that the server select a group of sites that are most similar to the test group of sites in which the initiative was implemented. This group of stores selected by the user or server 130 is the control group.

Figure 6:
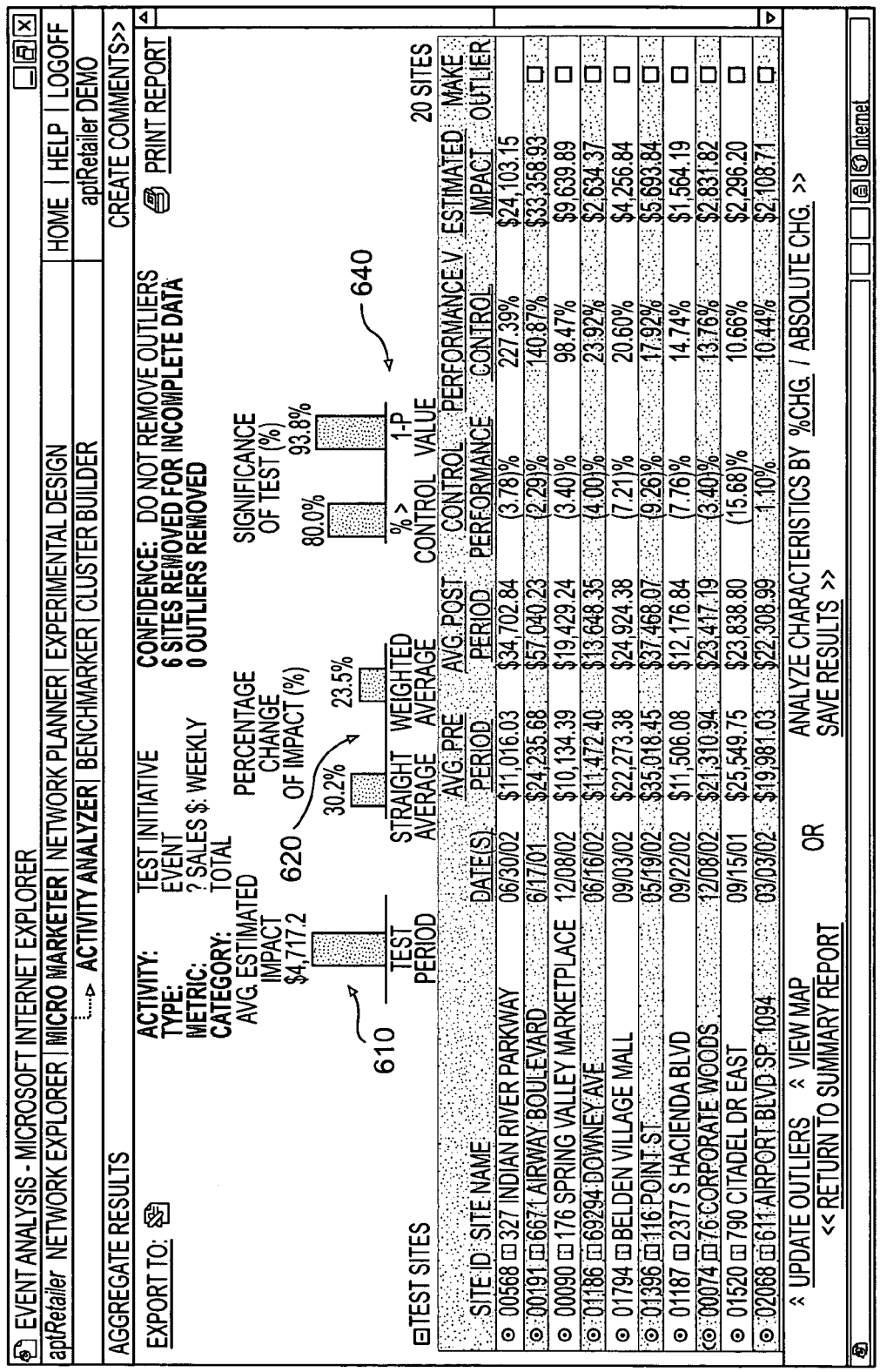
FIG. 6 shows a screen shot of an exemplary initial analysis results web page, consistent with certain aspects of the present invention.

Once the user has set the appropriate performance metrics, categories, etc. for the initiative analysis process, server 130 may perform an initial analysis on the test site initiative result data (Step 315). In one aspect, server 130 may determine a performance value for each test site as well as the control group sites for each performance metric and category selected by the user. The performance value of a test site may be measured as a change in a performance metric/category combination for each test site relative to the change in the control group sites over a common time period. Once server 130 determines the performance values for the test sites, it may provide the results of the initial analysis to user via client 118. FIG. 6 shows an exemplary screen shot of an initial analysis results web page including data reflecting the results of the initial analysis process.

As shown in FIG. 6, server 130 may provide information associated with the performance (e.g., performance values) of the test sites relative to the control group sites for the selected performance metric. In the exemplary screen shot of FIG. 6, server 130 provides the user with performance metric value changes in absolute values (e.g., actual dollars in sales) (e.g., graph 610), and in percentage values (e.g., graph 620). Further, server 130 may determine the average change in the selected performance metric for the test sites relative to the change in the same performance metric for the control group sites. This may be displayed in graph form as well. Additionally, server 130 may determine the likelihood that the performance of the test group relative to the control group of sites is not random chance. Server 130 may provide such confidence values to the user as a 1-p value (e.g., graph 640). The confidence value may be determined based on information reflecting a difference between test site performance metric data and control group site performance metric data.

Once server 130 completes the initial analysis process and provides the results of this process to the user, it may execute a segmentation process consistent with certain aspects related to the present invention (Step 320). The segmentation process may direct processor unit 134 to access the attributes associated with business locations 114 stored in database 140. Once accessed, the segmentation process sorts through the attributes to identify those that most strongly relate to the different test site's performance values during implementation of the initiative. In one aspect, server 130 may determine the strength of the relationship between each attribute and differential performance by test site (e.g., the attributes that are most in common among the top performing test sites and most different than the worst performing test sites).

III. SEGMENTATION PROCESS

Figure 7:
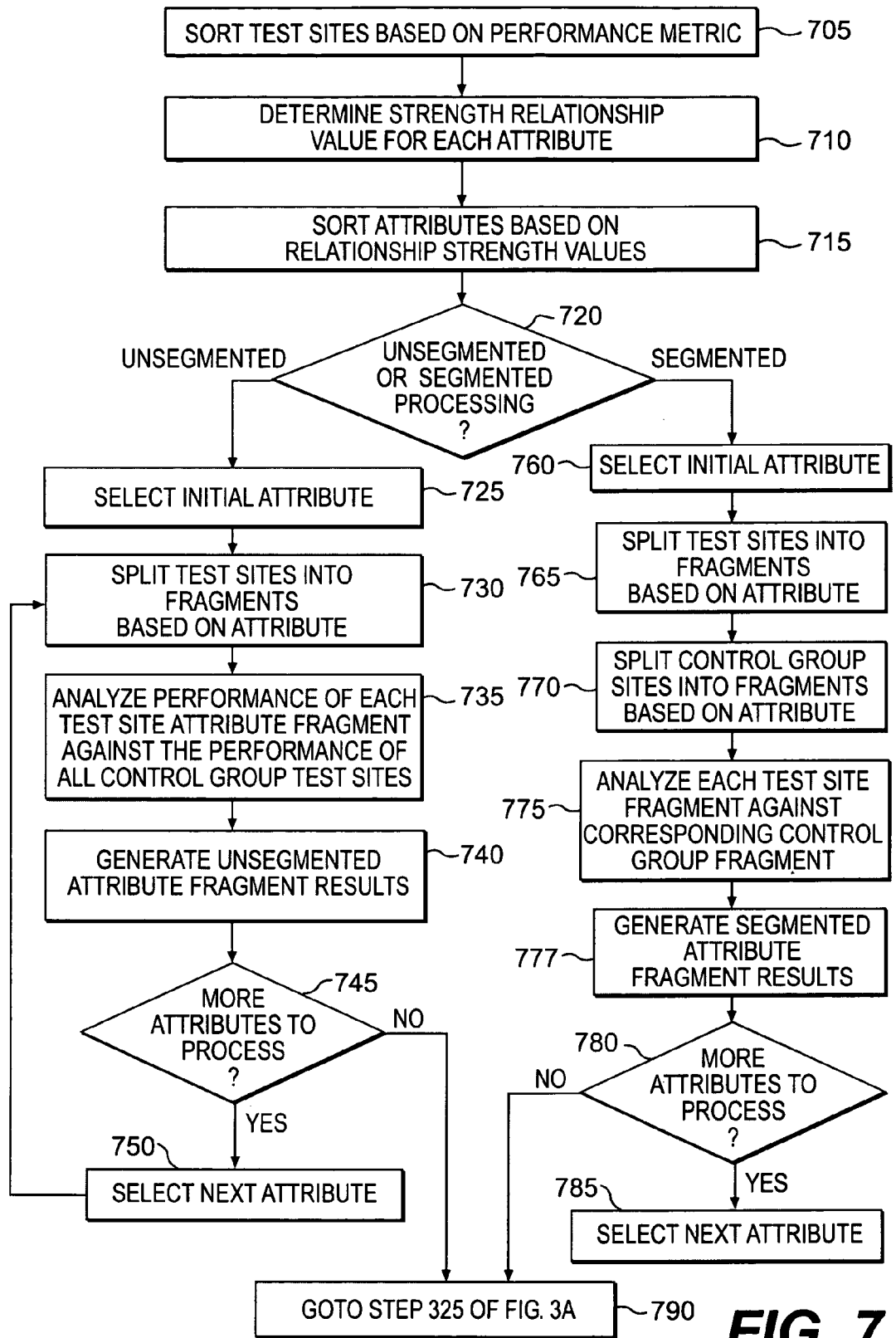
FIG. 7 illustrates a flowchart of an exemplary segmentation process, consistent with certain aspects of the present invention.

FIG. 7 shows a flowchart of an exemplary segmentation process consistent with certain aspects of the present invention. To segment the test site results, server 130 may execute segmentation engine 137 that initially sorts the test sites based on their corresponding performance metric results (Step 705). For example, if the selected performance metric is an average percentage of sales difference over a predetermined test period, then segmentation engine 137 may sort the test sites from highest to lowest average sales difference. FIG. 8 shows an exemplary test site attribute table including a sorted list of selected test sites 801 based on their corresponding performance metric performance values 802. Each test site is associated with one or more attributes 803 that correspond to some characteristic related to the test sites. Accordingly, segmentation engine 137 may determine a measurement of the strength of the relationship between each attribute 803 and the performance metric values 802 of test sites 801 (Step 710). In one aspect, segmentation engine 137 will use statistical processes to determine the strength of the relationship between the attributes 803 and performance metrics 802. For example, segmentation engine 137 may analyze the correlation and R-squared of each attribute to the performance of the test group sites. In such an example, the server 130 would create a scatter plot graph for each attribute. Data points in the scatter plot are associated with individual test sites. Server 130 plots the site's value for a selected attribute 803 on the x-axis and plots the value for the selected performance metric 802 on the y-axis. Server 130 then determines and places a regression line through the scatter plot to calculate the correlation and r-squared values of that regression line. These values (i.e., correlation and r-squared values) indicate the strength of the relationship between the selected attribute 803 and the performance metric 802. Server 130 repeats this process for every attribute. In one aspect, server 130 determines positive and/or negative correlations. A positive correlation means that as the value of an attribute increases, the value of the selected performance metric also increases. A negative correlation means that as the attribute value increases, the value of the selected performance metric decreases.

Once determined, segmentation engine 137 may sort the attributes based on the strength relationship values (Step 715). The sorting allows segmentation engine 137 to have a prioritized list of attributes that are ranked based on their relationship with the performance of the test sites. Thus, referring to FIG. 8, if segmentation process 137 determines that attribute 1 has the strongest relationship with the average sales difference of test sites 801 when compared to other attributes, that attribute may be ranked first in the list.

In certain aspects, segmentation engine 137 may perform an unsegmented or segmented process on the attributes and test sites. Unsegmented processing involves analyzing the performance of each test site against the performance of all control group sites. Segmented processing involves analyzing the performance of each test site against the performance of control group test sites having similar attribute relationships. Steps 725-750 and 760-785 demonstrate the differences between the two processes.

If segmentation engine 137 is directed or configured to perform unsegmented processing (Step 720; UNSEGMENTED), an initial attribute may be selected for processing (Step 725). Segmentation engine 137 may analyze the performance metric values associated with the selected attribute and splits the test sites into fragments that represent sets of test sites that are divided based on the statistical rank of their performance metric values (Step 730). In one aspect of the invention, segmentation engine 137 separates the test sites into quartiles, quintiles, or any number of fragments. Segmentation engine 137 may then analyze the performance metric values of each test site attribute fragment against the performance of all control group test sites (Step 735). Based on the analysis, segmentation engine 137 may generate unsegmented attribute fragment results, which may include a resultant map of fragments representing the difference between the performance metrics of each test site fragment and all of the control group sites (Step 740). This information may be stored in memory 136 or database 138.

In one aspect of the invention, segmentation engine 137 may also determine a value representing a relationship between the performance of the test sites (i.e., performance metric) and the selected attributeFor example, segmentation engine 137 may determine the 1-p value of the relationship between the performance of the test sites (i.e., performance metric) and the selected attribute. The 1-p value represents the probability that the relationship between the attribute and the performance metric (either positive or negative) is not random chance.

Figure 9:
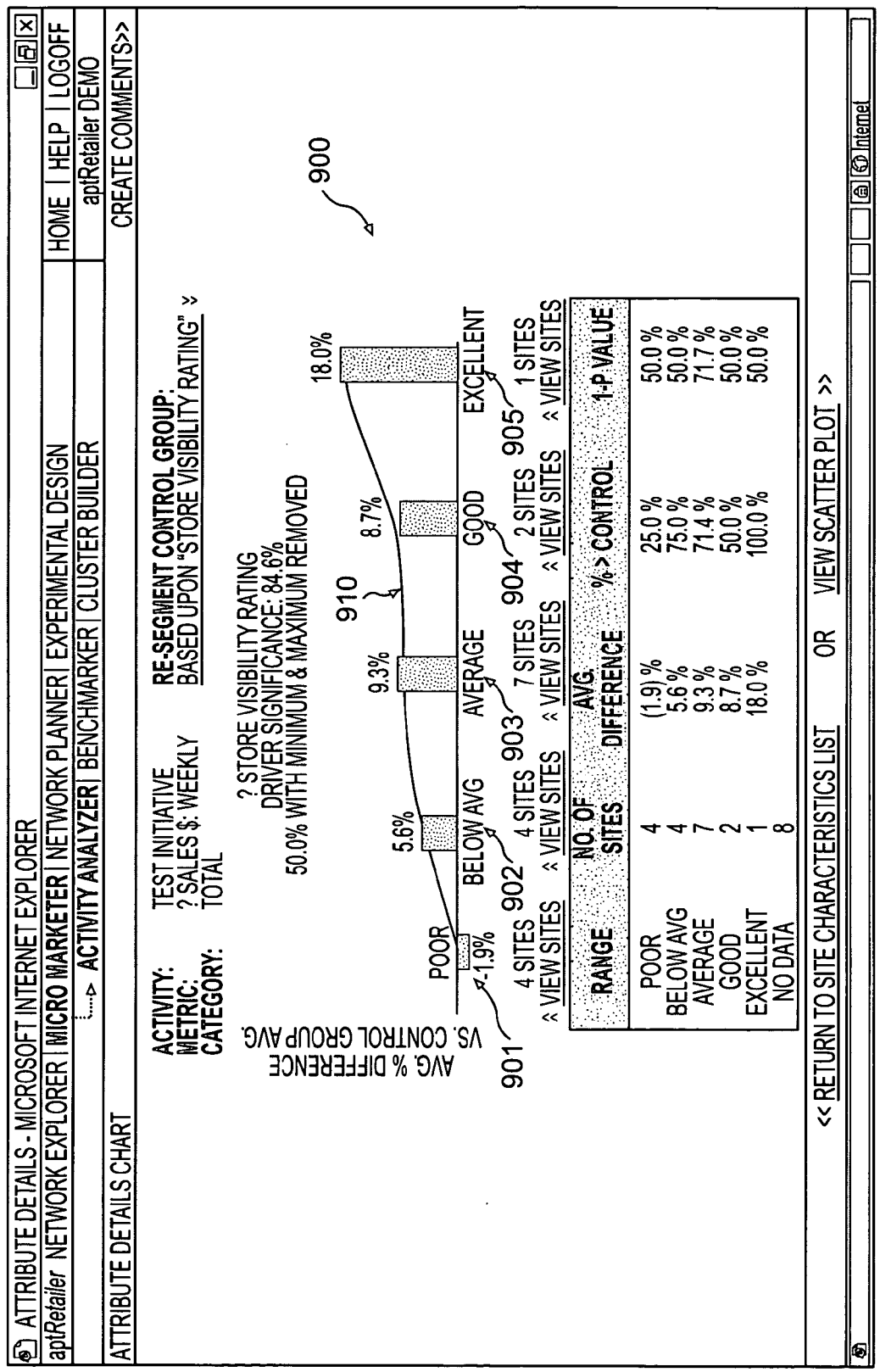
FIG. 9 shows an exemplary unsegmented attribute quartile result graph, consistent with certain aspects of the present invention.

FIG. 9 shows a graph 900 reflecting a relationship between the performance of the test sites (i.e., performance metric) and a selected attribute. As shown, graph 900 includes a number of fragments 901-905 reflecting the unsegmented attribute fragment results computed by segmentation engine 137. For this exemplary attribute, line 910 shows a positive correlation between the performance metric values and the attribute values.

If there are more attributes 803 to process (Step 745; YES), then segmentation engine 137 may select another attribute (Step 750) and the unsegmented process continues at Step 730. On the other hand, if there are no more attributes 803 to process (Step 745; NO), server 130 may end the segmentation process and proceed to Step 325 of the initiative analysis process of FIG. 3 (Step 790).

Figure 10:
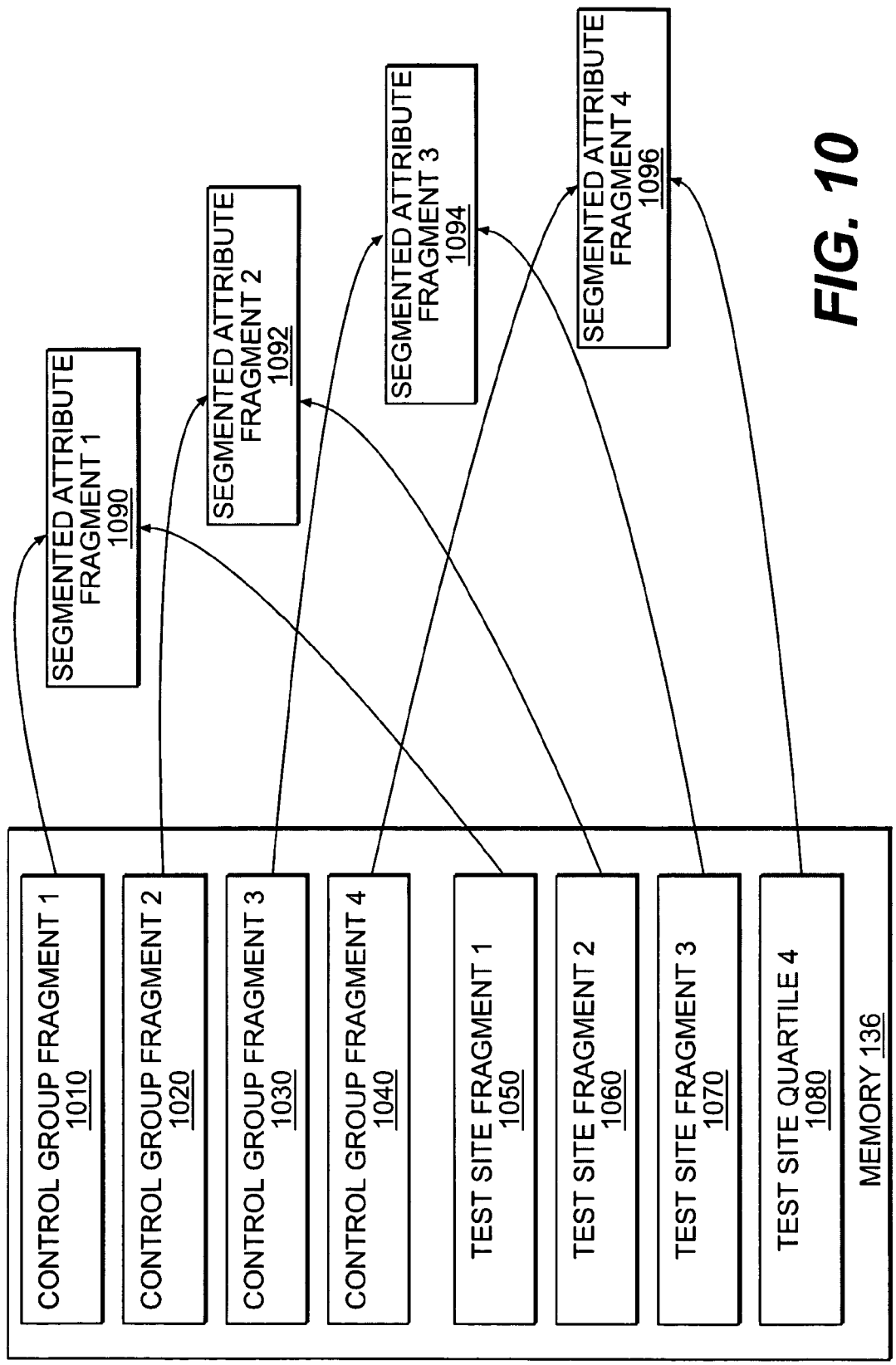
FIG. 10 shows a block diagram of a segmented attribute quartile comparison process, consistent with certain aspects of the present invention.

If segmentation engine 137 is directed or configured to perform segmented processing on the attributes (Step 720; SEGMENTED), an initial attribute 803 is selected for processing (Step 760). Segmentation engine 137 may split the test site performance metric results into fragments that represent sets of test sites that are divided based on the statistical rank of their values for the selected attribute (Step 765). In addition, segmentation engine 137 may split the control group sites into fragments based on their values for the same selected attribute (Step 770). Segmentation engine 137 may then analyze each test site fragment against a corresponding control group fragment (Step 775). The results of the analysis are processed into segmented attribute fragment results that reflect the differences in the performance metric values for the test sites and corresponding control group sites for the selected attribute (Step 777). To better understand this segmented analysis, FIG. 10 shows a block diagram of an exemplary segmented attribute fragment comparison process consistent with certain aspects related to the present invention.

As shown, memory 137 may store a set of control group fragment information 1010-1040 and a set of test site fragments 1050-1080 for a particular attribute under analysis. During a segmented process operation, segmentation engine 137 may compare corresponding fragments from each set to generate segmented attribute fragment information 1090-1096. For example, control group fragment 1010 may be analyzed against test site fragment 1050 to produce segmented attribute fragment 1090, while control group fragment 1020 is analyzed against test fragment 1060 to produce segmented attribute fragment 1092. The segmented attribute fragment information 1090-1096 is stored in memory 137 for subsequent processing. Accordingly, at Step 775 of FIG. 7, segmentation engine 137 generates and stores the segmented attribute fragment results in a memory device, such as memory 136 or database 140.

Also, segmentation engine 137 may determine a correlation value and a 1-p value in a manner similar to that described above in connection with Step 740 and FIG. 9. That is, segmentation engine 137 may determine a correlation and 1-p values that represent the strength of the relationship between the performance of the test sites (i.e., performance metric) and the selected attribute. The correlation values, 1-p values, and associated information may be stored in memory 136 or database 140.

If there are more attributes 803 to process (Step 780; YES), then segmentation engine 137 may select another attribute (Step 785) and the segmented process continues at Step 765. On the other hand, if there are no more attributes 803 to process (Step 780; NO), server 130 may end the segmentation process and proceed to Step 325 of the initiative analysis process of FIG. 3 (Step 790).

In addition to the processes performed during the segmentation process, server 130 may also generate pointers, software links, etc. between each attribute and its corresponding unsegmented and/or segmented attribute fragment information. Using these links, server 130 may generate content and data that allows the user to receive, view, and analyze the results of the segmentation processes (Step 325). For example, FIG. 11 shows an exemplary screen shot of an attribute table 1100 generated by server 130 consistent with aspects of the present invention. Table 1100 may be produced by server 130 using the attribute information generated during the segmentation process performed in Step 320 of FIG. 3. A user may request to view the attribute information by instructing server 130, via client 118, using queries, hyperlinks, and any other form of request technique through the browser software executing at client 118.

As shown, attribute table 1100 may include a list of all of the attributes 1110 associated with the test sites that have implemented the proposed initiative. These attributes may correspond to attributes 803 described above in connection with FIG. 8. Further, table 1100 may include a strength value 1120 representing a strength of the relationship between each attribute and the performance metric value on the test sites. As shown, attributes 1110 are ranked based on their corresponding strength values (e.g., R-squared values). Additionally, table 1100 may include correlation values 1130, and 1-p values for each attribute. These values may reflect the correlation values, 1-p values and information determined in Steps 730 and/or 775 of FIG. 7. As shown in FIG. 11, server 130 may determine and present correlation values for the test sites and control group sites.

Figure 12:
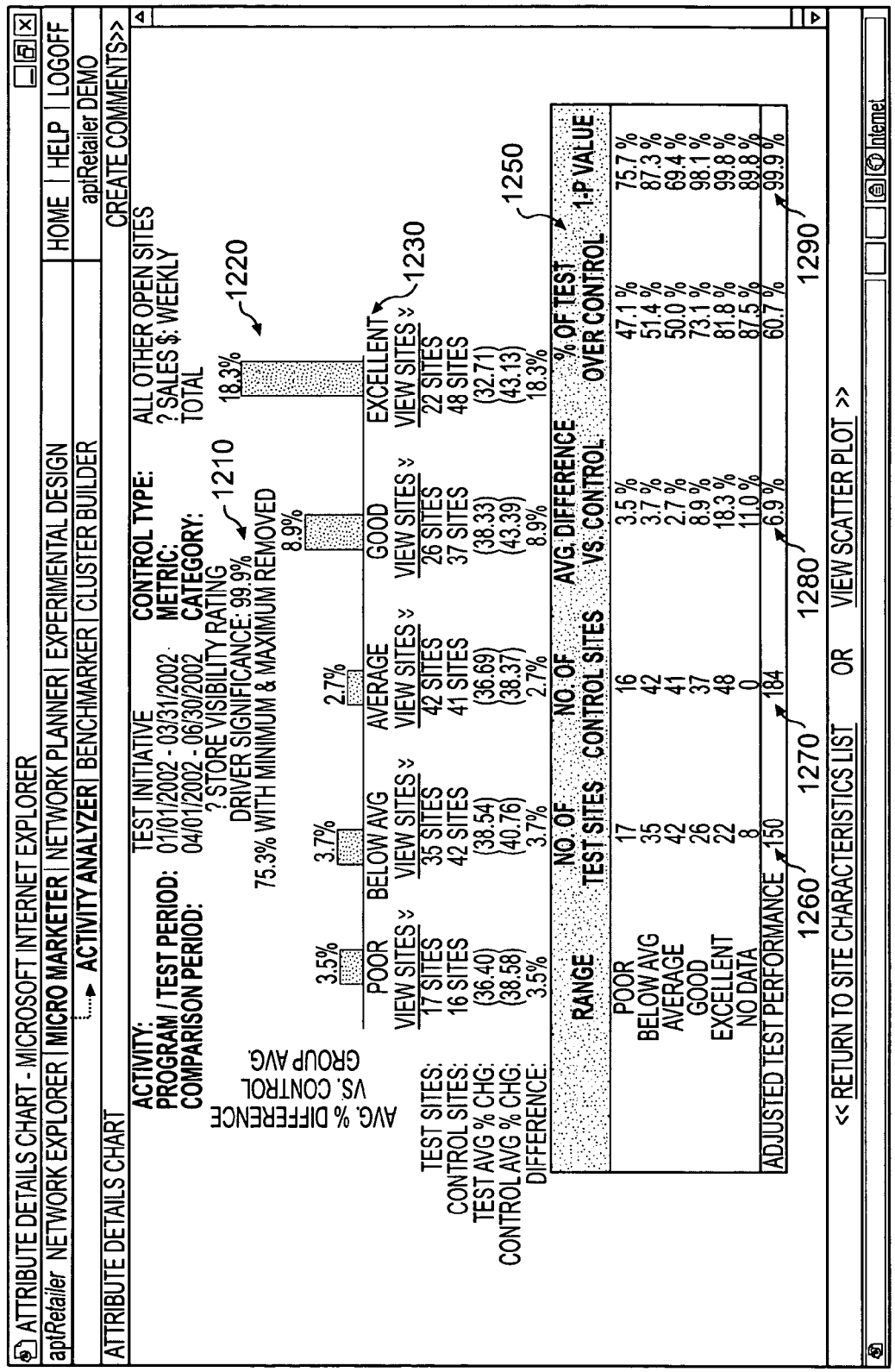
FIG. 12 shows a screen shot of an exemplary attribute details web page, consistent with certain aspects of the present invention.

In another aspect of the invention, the attributes 1110 listed in table 1100 may be active in that the user may select an attribute (e.g., click) using an input device to view additional information regarding the attribute selected. FIG. 12 shows a screen shot of an exemplary attribute details page associated with segmented attribute quartile results for a selected attribute 1210. In one aspect, the details page may include information representing the fragments generated by segmentation engine 137. For example, the details page may include a graph having segmented fragments 1220 for attribute 1210. On the X-axis of the graph may be the attribute information 1240 and the Y-axis is the performance metric values 1230, determined in this example in segmented form. Further, the details page may include a chart 1250 having information associated with the segmented attribute fragment data reflected in the graph. This information may include data reflecting the number of test sites 1260 and control group sites 1270 in each fragment, the computed performance metric data 1280, and a 1-p value 1290 reflecting a measure of likelihood that the relationship between the attribute and the performance metric values is not random. Segmentation engine 137 may calculate this value using statistical algorithms and/or processes based on the information provided by the segmented attribute fragment results.

Additionally, or alternatively, server 130 may generate and render a scatter plot graph in which each test site is a data point in the graph, the X-axis is the value for the selected attribute and the Y-axis is the performance metric values. Server 130 may be configured to allow the user to select more than one attribute from attribute table 1100. In response to this selection, server 130 may process and generate attribute graphs (e.g., fragment-based, scatter plot-based, etc.) including information showing the relationship between the multiple attributes and their corresponding performance metric values for the test sites.

Referring back to FIG. 3A, once the user has analyzed the segmentation process output data (Step 325), server 130 allows the user to select a model type and provide associated parameters for the model to be used for analyzing the initiative performed in the test sites (Step 330). Server 130 is configured to execute the selected model using information related to the test sites to identify the attributes that are deemed most relevant to the success of certain test sites that implemented the initiative. Server 130 uses the test site information to train the selected model. Once the user, or a software program, determines that the model is predicting accurate performance metric data based on the actual initiative feedback data provided by the test sites, server 130 may apply the model to the control group sites.

Figure 13:
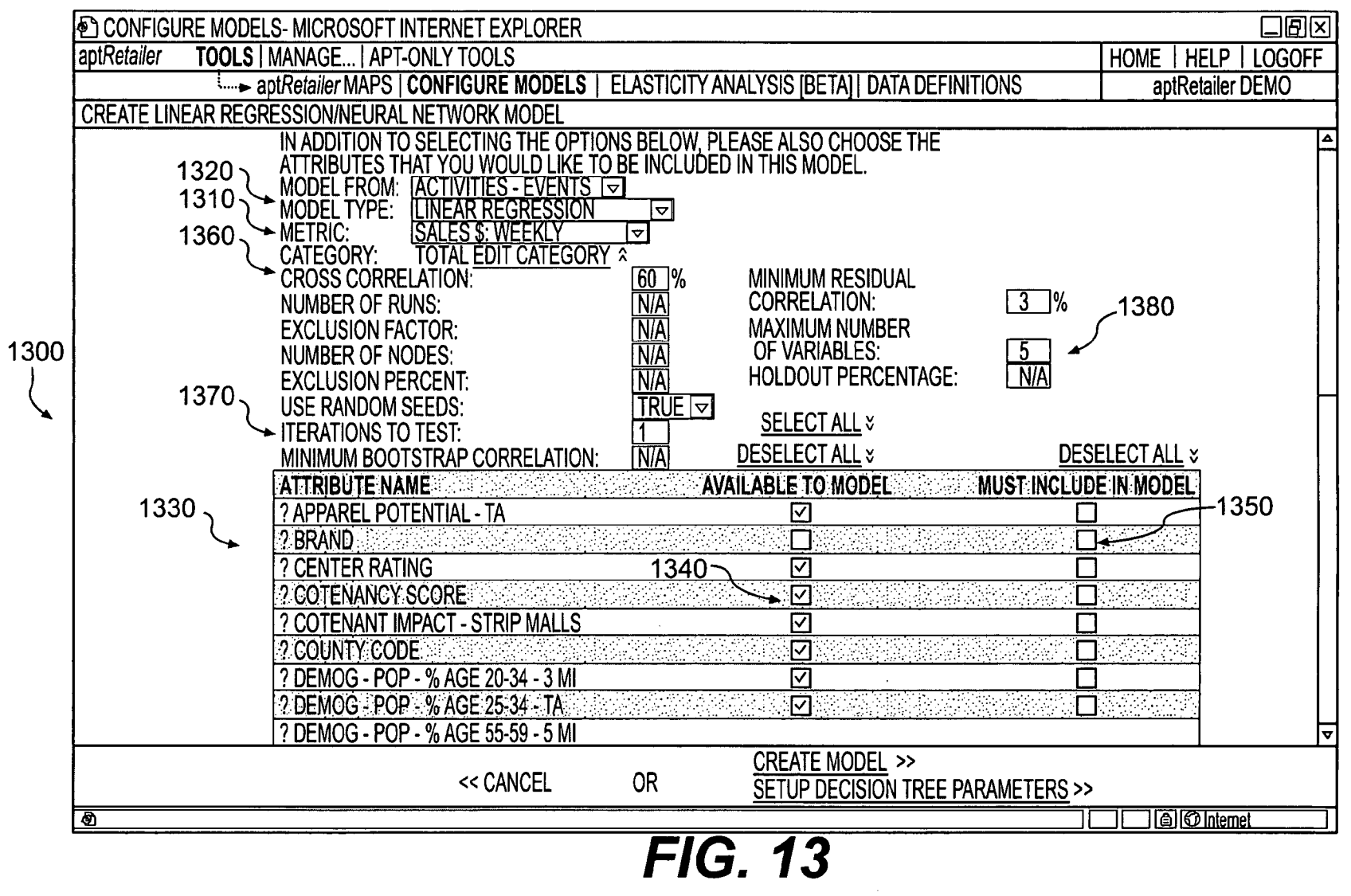

In one aspect of the invention, server 130 may offer different types of modeling methodologies that are used to predict performance values of the test and/or control group sites, such as linear regression, staged linear regression, neural network basic train, neural network stepwise regression, decision tree, K-means similar site modeling, and any other type of software model that may be used to analyze the information produced and/or collected by segmentation engine 137 and server 130 during the initiative analysis process. Server 130 may generate a web page that includes a list of modeling methodologies from which the user may select. Also, server 130 may allow the user to program a custom modeling methodology that may be used to analyze the initiative. Once the model is selected, server 130 may query the user for parameters and other type of information used by the selected model. FIG. 13 shows a screen shot of an exemplary model selection web page 1300 that includes menus for allowing the user to select a model and provide one or more parameters for the selected model.

As shown, web page 1300 allows the user to select the type of performance metric 1310 to run in the selected model 1320. Further, server 130 may allow the user to select which attributes 1330 are available for consideration by the selected model when executed. As shown in FIG. 13, the exemplary web page 1300 may allow the user to select/deselect an attribute 1330 using corresponding selection boxes 1340 and 1350 to indicate that the particular attribute is to be used by the selected model. Also, the user may provide parameter information, such as selecting the maximum number of attributes 1380 the model should use when completing its analysis of the test sites and the implemented initiative. For example, the user may instruct server 130 to consider only a certain number of the attributes with the strongest relationship to performance (e.g., the ten most important attributes) from among the entire list of attributes 1330. The user may force the model to include a particular attribute by selecting parameter box 1350 for that particular attribute. In this instance, server 130 always considers and uses the attributes selected via parameter 1350 when predicting performance values of the test sites.

Further, the user may also direct server 130 to consider cross correlations 1360 between attributes when executing the selected model. Cross correlation is a parameter that reflects the similarity between attributes and their affect on the selected model's results. For example, two or more of the selected attributes 1330 may be closely related, such as an attribute for the number of competitive business locations within a five mile radius and another attribute for the number of competitive business locations within a ten mile radius. These two exemplary attributes may affect the model in a similar fashion. The user may not want such similar attributes considered in the selected model. Accordingly, by setting the cross correlation parameter 1360, the user directs server 130 to remove one of the similar attributes (leaving one attribute) from consideration by the selected model. This enables server 130 to consider independent attributes when executing the selected model. Also, the user may select the number of iterations 1370 the model should run when training itself for producing its results.

Once the model and associated parameters are selected, server 130 may execute the selected model (Step 335). In one aspect, server 130 may leverage model processing engine 138 to process the model. In such an instance, server 130 provides the user's selections and parameters to engine 138 for subsequent processing. Further, model processing engine 138 may re-execute the model based on the number of iterations 1370 selected by user in Step 330. In this regard, engine 138 tests and trains the model to calibrate its results. For example, model processing engine 138 may build a model using a subset of the test sites (e.g., 20 out of 30 test sites) and tests the results of the model on the remaining test sites (e.g., the remaining 10 test sites). The model may compute predicted performance metrics for each of the remaining test sites based on the attributes selected by the model and compares them to the actual performance metrics of the remaining test sites. Server 130 may repeat this process for the number of iterations set by the user in Step 330.

Figure 14:
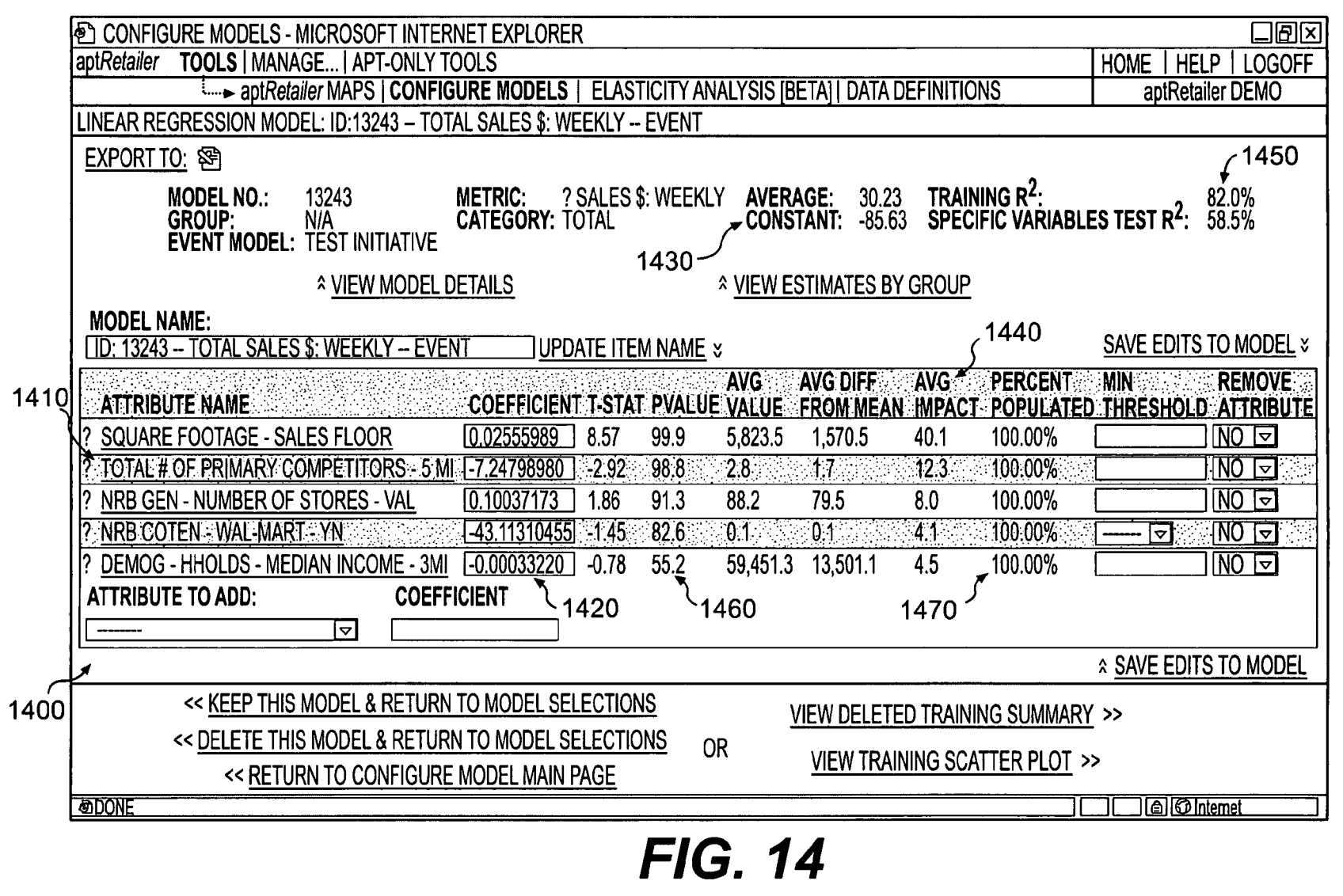

Once the model is executed, server 130 may generate and render the results to the user, via client 110. The user may then analyze the results of the executed model (Step 340). In one aspect, server 130 may generate a model results web page that includes information pertaining to the results of the executed model. FIG. 14 shows a screen shot of an exemplary model results web page 1400 consistent with certain aspects of the present invention. As shown, model results web page 1400 includes details of the attributes selected by the model. For example, web page 1400 may include a list of attributes 1410 used by the model. For each of these attributes, and based on the type of model selected by the user, server 130 may also provide details regarding the variables, constants, and other data used by the selected model. For example, results web page 1400 shows the results for a selected linear regression model. In this example, server 130 may provide the values for a linear least squares fitting algorithm used to find the best fitting line through a set of points. This algorithm may include a constant and co-efficient that are assigned to each attribute. Accordingly, server 130 may provide the co-efficient values 1420 assigned to each attribute used by the model. Further, the constant 1430 used by the model for this type of model algorithm may be included in results web page 1400. Additionally, server 130 may provide information showing the average impact 1440 of each attribute on the model results.

Moreover, server 130 may provide information showing how accurate the model predicts performance values of the test sites based on the selected parameters and the initiative. In one aspect, server 130 may provide quantitative measures reflecting the fitness of the model for predicting and analyzing the performance values of the test sites. For example, server 130 may provide an R-squared value 1450 reflecting a quantitative value of the model's fitness for predicting the success of the initiative in the control group sites. Alternatively, server 130 may express the fitness value as an error rate percentage value reflecting whether the predicted performance values are within a certain range of actual performance values associated with the test sites.

Additionally, server 130 may provide confidence measurements 1460 reflecting quantitative values of how well each attribute is actually contributing to producing a model that will successfully predict the performance metrics of the control group sites when implementing the initiative. Also, server 130 may determine and provide a percent populated value 1470 for each attribute 1410 that represents the percentage of test sites that server 130 has information for that particular attribute.

Figure 15:
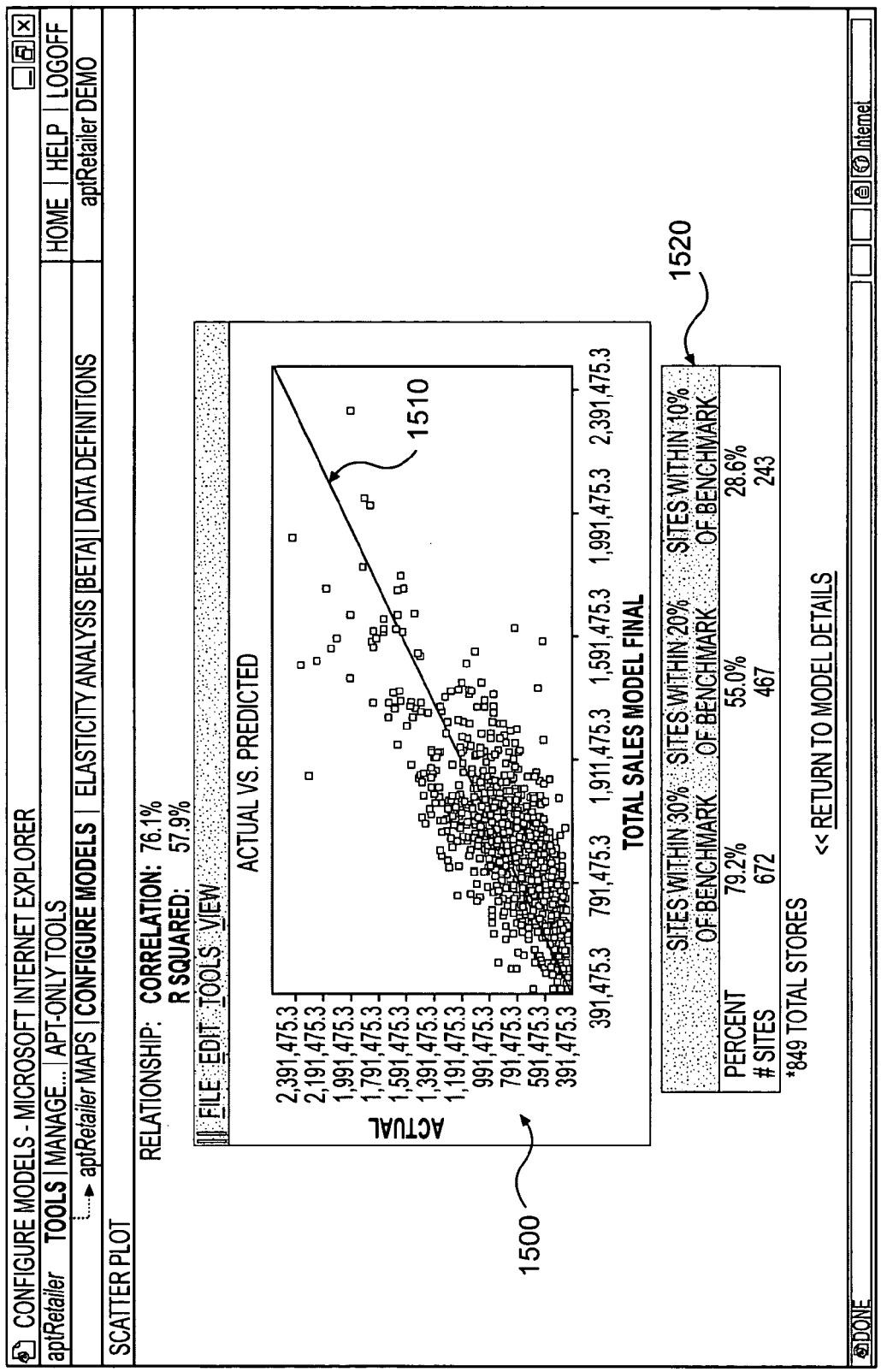
FIG. 15 shows a screen shot of an exemplary model results graph web page, consistent with certain aspects of the present invention.

In another aspect of the invention, model processing engine 138 may generate a graph showing the results of the executed model. FIG. 15 shows an exemplary model results graph 1500 page showing the results of the linear regression model explained above with respect to FIG. 14. The Y-axis of graph 1500 represents the actual performance metric values for each of the test sites and the X-axis represents the predicted performance metric values for the same test sites. Line 1510 represents a match between predicted performance metric values and actual performance metric values. The model processing engine 138 may determine the number of test sites are within certain ranges of a predetermined benchmark value. This information may be reflected as table 1520 that includes information showing the percentage and number of test sites within various percentages of the benchmark.

The user of business management unit 116 uses information reflected in graph 1500 and/or model results web page 1400 to determine whether the selected model and/or attributes are acceptable (Step 345). Alternatively, a software program executed by server 130 may analyze the information produced by the executed model to determine whether the model and/or attributes considered by the model are acceptable based on predetermined rules. Various factors may be considered by the user, or software program, when determining whether the model and/or attributes are acceptable. For example, a user may determine that one of the attributes 1410 considered by the selected model was not an appropriate attribute based on the percent populated value 1440 for that attribute. Alternatively, or additionally, the confidence measurement 1460 for an attribute may cause the user or the software program to determine that that attribute is not acceptable for consideration by the model. On a broader scale, the user or software program may determine that the selected model is not appropriate for predicting performance metrics for the non-test sites based on the confidence measurement for that model (e.g., r-squared value 1450). The above exemplary factors are not intended to be limiting and the user and/or software program may use other result information to determine the appropriateness of the selected model and/or attributes.

If the results are not acceptable (Step 345; NO), the user and/or software program may re-select a model, attributes, and/or parameters for analyzing the initiative (e.g., return to Step 330). For example, the user may remove one or more attributes from consideration prior to re-execution of the selected model. If, however, the results are acceptable (Step 345; YES), the user and/or software program may direct server 130 to apply the model to the non-test group sites to determine a predicted impact of the initiative on these sites (Step 350). The server 130 may do this by applying attributes 1410 and their corresponding coefficients 1420 selected by the model in step 335 to each non-test site's values for those attributes 1410. In doing so, server 130 calculates the predicted performance of the initiative on each non-test site based on that site's relevant attributes 1410.

Once server 130 applies the tested model to the non-test group sites and the test sites, a determination may be made as to those sites having the highest or more acceptable predicted performance metric values. Server 130 may rank the sites accordingly and provide this information to the user via client 118. FIG. 16 shows a business location analysis table that includes exemplary results from applying the model to the control group sites. As shown, FIG. 16 shows a list of business locations (e.g., control group and test sites) 1610 that are ranked based on each site's predicted performance metric values 1620. In other words, using the sales lift performance metric as an example, server 130 may place those sites that have an estimated larger sales lift when implementing the initiative higher in the list of sites 1610 than those who have lower estimated sale values. Further, server 130 may provide information showing the actual performance metric values 1630 for those test sites that implemented the initiative and provided actual feedback information to server 130. Based on the exemplary results depicted in FIG. 16, the user may select one or more of the non-test sites to implement the initiative. Accordingly, the user analyzes the information provided by model processing engine 138 and server 130 to make an informed decision on which sites to implement the initiative tested at the test sites. Along the same lines, the user may also select those sites that should not implement the proposed initiative.

In another aspect of the invention, server 130 may provide results of the processed model based on any grouping of the sites. One such example of a group of sites are regions 112-1 to 112-N explained above in connection with FIG. 1. FIG. 17 shows a table that includes exemplary results from applying the model to the non-test group sites in a region format For example, FIG. 17 shows an exemplary table listing the regions 1710 having those business locations (e.g., control group sites and/or test sites) 1720 and their associated predicted performance metric values 1730 and actual performance metric values 1740 (if applicable). As with the table depicted in FIG. 16, server 130 may rank the regions 1710 accordingly to their predicted performance metric values. Thus, those regions having business locations with corresponding high estimated performance metric values are ranked above those regions with lower or less attractive performance metric values. Accordingly, instead of selecting individual business locations for implementing the initiatives, the user may determine which regions to apply the proposed initiative based on the information provided by server 130 in this format.

IV. CONCLUSION

Variations of the methods and systems consistent with features of the present invention previously described may be implemented without departing from the scope of the invention. For example, server 130 may be configured with software that automatically performs some or all of the analysis and decisions performed by a user operating client 118. For instance, server 130 may include software stored in memory 136 that, when executed by processing unit 134, analyzes the list of attributes ranked according to their impact on the performance metric values of the test sites (e.g., correlation and/or r-squared values). Server 130 may also execute software that selects the model and associated parameters (e.g., attributes, iterations, etc.) for predicting the performance levels of the test and non-test group sites. Additional, server 130 may execute software that selects one or more of the non-test group sites to implement the tested initiative based on the predicted performance values produced by the executed model. The above processes are not intended to be limiting and other procedures may be performed by software processes executed by server 130 and/or client 118 to supplement and/or compliment those decisions, data input, and analysis performed by a user.

Also, although the initiative analysis process is described as using web server and browser software for exchanging information with client 118 and server 120, methods and systems consistent with aspects of the invention may use any type of technology to allow a user to send and receive information from server 120. Further, although the above described aspects of the invention include communications between a client 118 and a server 120, methods and systems consistent with aspects of the invention are not limited to client-server network configurations. That is, a user associated with business network 110 may leverage a computing environment that is local (i.e., same computing system) to a system operated by the user.

Further, methods, systems, and articles of manufacture, consistent with features of the present invention may be implemented using various network models, and is not limited to a particular computer and/or network environment. Furthermore, methods, systems, and articles of manufacture, consistent with features of the present invention are not limited to the implementation of systems and processes compliant any particular type of programming language. Any number of programming languages may be utilized without departing from the scope of the present invention.

Additionally, although aspects of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described aspects of the invention, but instead is defined by the appended claims in light of their full scope of equivalents.

What is claimed is:

1. A method for analyzing a business initiative for a business network including business locations including test sites that have implemented the business initiative during a predetermined test period and non-test group sites that have not implemented the initiative, each of the sites being associated with a set of attributes, the method comprising:
   generating test site fragments based on the value of each attribute and performance value for each test site;
   generating control site fragments based on the value of each attribute and performance value for each control group site, where the non-test group sites include a set of control group sites;
   determining the strength relationship of the between each attribute and the performance values of the test sites based on an analysis between selected test site fragments and corresponding control site fragments;
   generating, by a server, a list of the attributes ranked based on the strength relationship between the attribute and performance value for each control group site;
   configuring a model to predict the performance value of the sites based on the ranked list of attributes; and
   instructing the server to apply the model to the non-test group sites to predict the performance levels of the non-test group sites, wherein such prediction can be used to decide whether to implement the business initiative.

2. The method of claim 1, further comprising:
   selecting a subset of the non-test group sites to implement the business initiative based on the ranked list of those sites.

3. The method of claim 1, wherein configuring the model includes:
   selecting the model from a list of models provided by the server; and
   selecting one or more parameters for the selected model.

4. The method of claim 1, wherein receiving results of the executed model further includes:
   reconfiguring the model with at least one new parameter based on a determination that
   the model does not accurately predict the performance levels of the test sites;
   and instructing the server to execute the reconfigured model for the test sites.

5. The method of claim 4, further comprising:
   repeating the reconfiguring and executing the reconfigured model until the quantitative measure reflect that the model accurately predicts the performance levels of the test sites.

6. The method of claim 1, wherein configuring the model includes:
   selecting a number of the ranked attributes that the model should consider when executing.

7. The method of claim 1, receiving results of the executed model, wherein the results include quantitative measures of the model's ability to accurately predict the performance levels of the test sites, wherein the quantitative measures includes a ranked list of selected attributes that the model considered during its execution and data values assigned to each of the selected attributes by the model.

8. The method of claim 7, wherein the data values includes a coefficient data value for a mathematical function used by the model to generate the results.

9. The method of claim 1, wherein the list of the attributes ranked based on each attribute's impact on the test site performance values is generated by the server based on comparisons between test site fragments and corresponding control group site fragments.

10. The method of claim 1, further comprising:
    instructing the server to execute the model for the test sites; and
    receiving results of the executed model, wherein the results include quantitative measures of the model's ability to accurately predict the performance levels of the test sites.

11. The method of claim 1, further comprising generating a list of non-test group sites ranked based on each non-test group site's predicted performance level.

12. A computer program product, comprising a non-transitory computer readable media having computer program code therein, said computer program code adapted to cause a computer to perform the following steps of:
    analyzing a business initiative for a business network including business locations having sites including test sites that have implemented the business initiative during a predetermined test period and non-test group sites that have not implemented the initiative, each of the sites being associated with a number of attributes, wherein the non-test group sites includes a set of control group sites;
    determining, the impact of each of the attributes on performance values of the test sites during the test period by:
       segmenting the test sites into fragments based on a selected attribute and the performance value for the test sites,
       segmenting the control group sites into fragments based on the selected attribute and the performance value for the control group sites, and
       determining the strength of the relationship between the selected attribute and the test site performance values based on a comparison of the test site fragments and corresponding control group fragments;
    configuring, a model, based on user input associated with the attributes, that predicts performance values of the test sites in relation to actual performance values of the test sites during the test period, and
    executing, the model for the non-test group sites to produce predicted performance values for the non-test group sites when implementing the business initiative.

13. The computer program product of claim 12, wherein the computer program code further includes program code for providing a user with a list of non-test group sites ranked according to each non-test group site's predicted performance value.

14. The computer program product of claim 13, further including operating by a client remotely located from the system.

15. The computer program product of claim 13, wherein the user input associated with the attributes includes a user selection of one or more of the attributes that are to be considered by the model when executed.

16. The computer program product of claim 15, wherein the computer program code for reconfiguring the model includes program code for receiving instructions from the user to remove at least one of the selected one or more attributes from consideration by the model.

17. The computer program product of claim 13, wherein the computer program code for executing the model for the test sites includes program code for configuring the model using a subset of the test sites and testing the model's ability to accurately predict performance values by predicting the performance values of test sites not included in the subset of test sites.

18. The computer program product of claim 12, further comprising executing, the model for the test sites to produce results reflecting the model's ability to accurately predict the performance values of the test sites.

19. The computer program product of claim 12, further comprising reconfiguring the model based on additional user input associated with the attributes.

* * * * *